US007750068B2

(12) United States Patent
Nishida et al.

(10) Patent No.: US 7,750,068 B2
(45) Date of Patent: Jul. 6, 2010

(54) COLORED COMPOSITION FOR COLOR FILTER AND COLOR FILTER

(75) Inventors: Atsushi Nishida, Tokyo (JP); Toru Omura, Tokyo (JP); Takashi Yamauchi, Tokyo (JP); Takeshi Itoi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 1205 days.

(21) Appl. No.: 11/061,612

(22) Filed: Feb. 22, 2005

(65) Prior Publication Data

US 2005/0215675 A1 Sep. 29, 2005

(30) Foreign Application Priority Data

Feb. 23, 2004 (JP) ............................ 2004-046633

(51) Int. Cl.
*C08K 5/34* (2006.01)
*C07D 215/38* (2006.01)
*C07D 215/04* (2006.01)
*C07D 215/16* (2006.01)

(52) U.S. Cl. ......................... 524/99; 546/171; 546/172; 546/173; 546/175; 546/178

(58) Field of Classification Search ................... 524/99; 428/419; 523/160, 161; 546/172, 173, 175, 546/171, 178; 106/31.6, 31.7; 430/114, 430/115, 116
See application file for complete search history.

(56) References Cited

U.S. PATENT DOCUMENTS 4,510,321 A * 4/1985 Masilamani et al. ........ 562/421
5,698,024 A * 12/1997 Badejo et al. ............... 106/495
5,714,538 A * 2/1998 Beach et al. ................ 524/504

FOREIGN PATENT DOCUMENTS

| | | | |
|---|---|---|---|
| JP | 2002121457 | * | 4/2002 |
| JP | 2002121458 | * | 4/2002 |
| JP | 2002179979 | * | 6/2002 |
| JP | 2004067715 | * | 3/2004 |
| JP | 2005112915 | * | 4/2005 |

OTHER PUBLICATIONS

English translation of JP 2002-179979, "Color Paste, Color Filter and Liquid Crystal Display Panel", Nomura et al.*
English language translation of JP 200-121457, pp. 1-44.*
English language translation of JP 2002-121458, pp. 1-22.*
English language translation of JP 2004-66715, pp. 1-17.*
English language translation of JP 2005-112915, pp. 1-17.*
M. Khan, Journal of organic Chemistry, vol. 61, pp. 8063-8068, 1996 (6 pages).*
Jerry March, "Advanced Organic Chemsitry: Reactions, Mechanisms and Structure", 4th Edition, John Wiley & Sons, New York pp. 1176-1177 (1992).*

* cited by examiner

*Primary Examiner*—Vasu Jagannathan
*Assistant Examiner*—Alexander C Kollias
(74) *Attorney, Agent, or Firm*—Nixon & Vanderhye P.C.

(57) ABSTRACT

A colored composition for color filter contains a pigment carrier made of a transparent resin, a precursor thereof, or a mixture thereof, an organic pigment, and a pigment-dispersing agent containing a quinoline derivative having a formula as described in the specification or an amine or metal salt. The color filter contains filter segments formed with the color composition.

12 Claims, No Drawings

COLORED COMPOSITION FOR COLOR FILTER AND COLOR FILTER

CROSS-REFERENCE TO RELATED APPLICATIONS

This application is based upon and claims the benefit of priority from the prior Japanese Patent Application No. 2004-46633, filed Feb. 23, 2004, the entire contents of which are incorporated herein by reference.

BACKGROUND OF THE INVENTION

1. Field of the Invention

The present invention relates to a colored composition for color filters for use in production of color filters used in, for example, color liquid crystal displays, color camera tubes, and the like, and a color filter formed by using the same.

2. Description of the Related Art

Color filters are made of a transparent substrate such as a glass substrate and filter segments in two or more different colors in the shape of very narrow band (stripe) arranged in parallel or at an angle or minute filter segments arranged orderly in certain vertical and horizontal directions formed on the surface of the substrate. The filter segments have a very narrow width of several microns to several hundred microns and are arranged orderly in a particular pattern respectively according to the colors.

Generally, a transparent electrode for driving liquid crystal is formed on the color filters used in color liquid crystal displays by vapor deposition or sputtering, and an orientation film for orientating the liquid crystal in a certain direction is formed further on the electrode. For obtaining the transparent electrode and orientation film sufficiently high in performance, they should be processed normally at a high temperature of 200° C. or more, preferably 230° C. or more.

Accordingly, the color filters are currently produced mainly by a so-called pigment dispersion method wherein a pigment superior in light stability and heat resistance is used as a colorant, mostly according to the following two methods.

In the first method, a color filter is produced in the steps of coating a pigment dispersion containing a pigment dispersed in a photosensitive transparent resin solution on a transparent substrate such as a glass substrate, drying the coated substrate for removal of the solvent, subjecting the substrate to a pattern exposure for a filter color, forming a pattern for the first color by removing an unexposed portion in a developing process, treating the resulting substrate by, for example, heating as needed, and repeating the similar operations for all filter colors one by one.

In the second method, a color filter is produced in the steps of coating a pigment dispersion containing a pigment dispersed in a photosensitive transparent resin solution on a transparent substrate such as a glass substrate, drying the coated substrate for removal of the solvent, coating a resist such as a positive-type resist on the coated film, subjecting the substrate to a pattern exposure for a filter color, forming a resist pattern by development, removing the pigment dispersion coated film to which no resist pattern is attached with an etchant by using the pattern as an etching resist, forming a patter for the first color by removing the resist film, treating the resulting substrate by, for example, heating as needed, and repeating the similar operations for all filter colors one by one. Development of the resist and etching of the pigment dispersion coated film may be carried out at the same time.

In production of the color filter, dispersion of the pigment in the colored composition is quite important, and use of a colored composition lower in dispersion often results in deterioration in contrast of the color filter produced.

Colored compositions containing a pigment-dispersing agent have been used for production of filter segments, and a sulfonated compound of C.I. Pigment Yellow 138, or a salt thereof produced by neutralizing the compound with an aqueous metal alkali or amine solution, i.e., a sulfonation derivative of C.I. Pigment Yellow 138, has been used as the pigment-dispersing agent in the past (for example, Jpn. Pat. Appln. KOKAI Publication Nos. 9-176511, 2002-179979, and 2003-167112).

However, under the circumstance demanding further improvement in the physical properties, such as dispersion stability, storage stability, and uniformity of the filter segments formed, of the colored compositions for use in production of color filters, the sulfonation derivative of C.I. Pigment Yellow 138 conventionally used is becoming more difficult to satisfy the requirements. Especially in recent years, more liquid crystal displays are used in television monitor application, and there exists a need for higher-concentration color filters containing a greater amount of pigment for production of such panels.

BRIEF SUMMARY OF THE INVENTION

An object of the invention is to provide a colored composition for color filters superior in dispersion stability and especially in storage stability.

According to a first aspect of the invention, there is provided a colored composition for color filters, containing: a pigment carrier made of a transparent resin, a precursor thereof, or a mixture thereof; an organic pigment; and a pigment-dispersing agent comprising a quinoline derivative represented by the following general formula (1) or (2):

General formula (1):

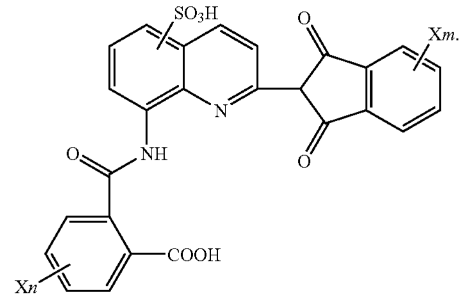

General formula (2):

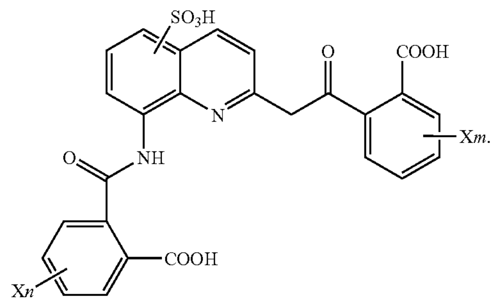

where X represent a halogen atom selected from chlorine, bromine and iodine; n and m each independently represent the number of halogen atoms X, and are each an integer of 0 to 4, or an amine salt or metal salt thereof.

According to another aspect of the invention, there is provided a color filter comprising filter segments formed from the colored composition according to the invention.

In particular, use of an aluminum salt of the quinoline derivative represented by the general formula (1) or (2) as the pigment-dispersing agent is favorable for production of the color composition higher in storage stability.

Further, addition of a resinic or resin type dispersing agent, in particular a basic resinic dispersing agent, to the colored composition according to the invention is preferable for improvement in compatibility with the pigment carrier.

Moreover, a pigment carrier containing a copolymer resin of a compound (a) represented by the following general formula (3) and a compound (b) having another ethylenically unsaturated double bond is favorable for improvement in compatibility with the pigment carrier.

General formula (3):

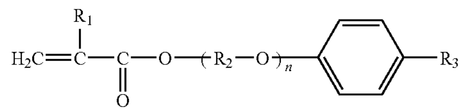

where $R_1$ represents H or $CH_3$; $R_2$ represents an alkylene group; $R_3$ represents H or an alkyl group having 1 to 20 carbons which may contain a benzene ring; and n is an integer of 1 to 15.

DETAILED DESCRIPTION OF THE INVENTION

A colored composition for color filters according to the invention will be described first.

The colored composition for color filters according to the invention comprises a pigment carrier, an organic pigment, and a pigment-dispersing agent consisting of a quinoline derivative represented by the above general formula (1) or (2) or an amine or metal salt thereof (hereinafter, referred to as quinoline derivative). The pigment-dispersing agent has both a sulfonic acid group and a carboxyl group in the molecule.

Examples of amines composing the amine salt of the quinoline derivative include lower amines such as ammonia, dimethylamine, trimethylamine, diethylamine, triethylamine, hydroxyethylamine, dihydroxyethylamine, 2-ethylhexylamine, N,N-dimethylaminopropylamine, N,N-diethylaminopropylamine, and N,N-dibutylaminopropylamine; long-chain alkyl amines containing an alkyl group having 12 or more carbons such as laurylamine, oleylamine, palmitylamine, stearylamine, and dimethyllaurylamine; and long-chain quaternary alkyl ammonium ions containing an alkyl group having 12 or more carbons such as lauryltrimethylammonium, dilauryldimethylammonium, stearyltrimethylammonium, and distearyldimethylammonium. Among them, use of a salt of long-chain alkylamines containing an alkyl group having 12 or more carbons such as laurylammonium or stearylammonium salt results in colored compositions excellent in dispersion stability and in particular in storage stability.

Examples of metals composing the metal salt of the quinoline derivative include various metals such as sodium, potassium, calcium, barium, iron, magnesium, aluminum, nickel, cobalt, and strontium. Among them, use of an aluminum salt leads to a colored composition superior not only in the efficiency of separation during production and the dispersibility as a pigment-dispersing agent but also lower in viscosity and superior in flow properties and viscosity stability over time.

The quinoline derivatives represented by General formulae (1) and (2) can be produced in the following two processes. That is, the first process is a process of sulfonating a phthalimidoquinophthalone represented by C.I. Pigment Yellow 138 with sulfuric acid, fuming sulfuric acid, or the like, and the second process is a process of re-dispersing the resulting sulfonated compound in water and hydrolyzing the compound under an alkaline condition at a pH of 11 or more.

The sulfonation of phthalimidoquinophthalone in the first process may be carried out by any one of know methods. For example, C.I. Pigment Yellow 138 is dissolved in sulfuric acid, fuming sulfuric acid, a mixture of sulfuric acid and fuming sulfuric acid, chlorosufonic acid, or the like, and the resulting mixture is heated at 40 to 140° C. for 1 to 8 hours. The progress and completion of sulfonation can be monitored and determined by componential analysis by liquid chromatography and from the change in the absorption spectrum of the sulfuric acid solution. After confirmation of sufficient progress of sulfonation, the reaction solution is poured into a large amount of ice water, and the precipitated sulfonated compound is filtered, washed with dilute hydrochloric acid, and thoroughly washed with purified water, to give a sulfonated compound of C.I. Pigment Yellow 138 as a paste.

The alkaline hydrolysis of the sulfonated compound in the second process is carried out according to the following method. That is, the paste of the sulfonated compound of phthalimidoquinophthalone obtained in the first process is re-dispersed in water in an amount of about 100 times larger by weight, and the mixture is adjusted to a pH of 11 or more with an aqueous sodium hydroxide solution and stirred for 1 to 10 hours. When the pH is kept at 11 or more, the reaction solution changes from a yellow slurry containing undissolved dispersed particles to a red solution containing the particles dissolved therein. The progress of the alkaline hydrolysis reaction can be monitored by liquid chromatography. The reaction solution may be heated as needed to a temperature of 50° C. or more for 4 to 24 hours while keeping the pH at 11 or more to allow the hydrolysis reaction to progress sufficiently.

The salt-forming reaction between the quinoline derivative prepared in the first and second processes and an amine or a metal can be carried out according to the following method. That is, a solution of an amine in water or a water-soluble organic solvent such as alcohol, or powder or an aqueous solution of a metal chloride, sulfate salt, nitrate salt, or the like is added to the red aqueous solution containing the alkaline hydrolysate obtained in the second process gradually over a period of 10 minutes to 5 hours, allowing the salt-forming reaction to proceed. The amine or the metal is added until the bleeding stops, and the amount thereof used is usually 1 to 5 moles with respect to 1 mole of the acidic group of the quinoline derivative. Then, the precipitated product is filtered, washed with water thoroughly, and dried, to give a desired product.

Any one of common organic pigments commercially available may be used as the organic pigment contained in the colored composition according to the invention, and a synthetic or natural dye or an inorganic pigment may be used in combination according to the hue of the filter segment to be formed.

An organic pigment effective in coloring and superior in heat resistance, especially in thermal decomposition resistance, is favorably used. The organic pigments and others may be used alone or as a mixture of two or more.

In addition, the organic pigment may be pulverized, for example, by salt milling or acid pasting.

Typical examples of the organic pigments for use in the colored composition according to the invention are shown below by their respective color indexes.

Red pigments such as C.I. Pigment Red 7, 14, 41, 48:1, 48:2, 48:3, 48:4, 81:1, 81:2, 81:3, 146, 177, 178, 184, 185, 187, 200, 202, 208, 210, 246, 254, 255, 264, 270, and 272 can be used for forming a red filter segment with the colored composition according to the invention.

Green pigments such as C.I. Pigment Green 7, 10, 36, and 37 are used for forming a green filter segment with the colored composition according to the invention.

Blue pigments such as C.I. Pigment Blue 15:1, 15:2, 15:3, 15:4, 15:6, 16, and 80 can be used for forming a blue filter segment with the colored composition according to the invention.

Yellow pigments such as C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 139, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 198, 213, and 214 can be used for forming an yellow filter segment with the colored composition according to the invention.

Magenta pigments such as C.I, Pigment Red 7, 14, 41, 48:1, 48:2, 48:3, 48:4, 81:1, 81:2, 81:3, 146, 177, 178, 184, 185, 187, 200, 202, 208, 210, 246, 254, 255, 264, 270, and 272 can be used for forming a magenta filter segment with the colored composition according to the invention.

Pigments such as C.I. Pigment Blue 15:1, 15:2, 15:3, 15:4, 15:6, 16, and 80 can be used for forming a cyan filter segment with the colored composition according to the invention.

An inorganic pigment such as titanium oxide, barium sulfate, zinc white, lead sulfate, lead yellow, zinc yellow, iron oxide red (red iron oxide (III)), cadmium red, ultramarine, iron blue, chromium oxide green, cobalt green, amber, titanium black, synthetic iron black, or carbon black may be added to the colored composition according to the invention for providing favorable coatability, sensitivity, printing efficiency, and the like while keeping the balance between chroma and lightness. The inorganic pigment may be used in an amount of 0.1 to 10% by weight with respect to that of organic pigments.

If the colored composition according to the invention contains two or more pigments, the colored composition can be produced by blending two or more pigments and dispersing the pigment mixture obtained finely in a pigment carrier according to a known method. Alternatively, the colored composition may be produced by blending dispersions each having a pigment or the like finely dispersed in a pigment carrier.

In the colored composition according to the invention, the weight ratio of the organic pigment to quinoline derivatives is usually 50:50 to 99:1. If the amount of the quinoline derivatives used is below the range, it is not possible to exert the pigment dispersion-stabilizing effect sufficiently, while an amount of the quinoline derivatives used exceeding the range may result in drastic change in the color tone of the filter segment and cause the problem of production cost. The ratio of the organic pigment to the quinoline derivatives is preferably 60:40 to 95:5, more preferably 70:30 to 90:10, and still more preferably 85:15 to 90:10 by weight.

The colored composition according to the invention preferably contains additionally a resinic dispersing agent. The resinic dispersing agent, which has a pigment-compatible site that is adsorbed on the pigment and a pigment carrier-compatible site, plays a role of stabilizing the dispersion of a pigment in the pigment carrier as adsorbed on the pigment. Examples of the resinic dispersing agent include polyurethanes, polycarboxylic acid esters such as polyacrylate, unsaturated polyamides, polycarboxylic acids, polycarboxylic acid (partial) amine salts, polycarboxylic acid ammonium salts, polycarboxylic acid alkylamine salts, polysiloxanes, long-chain polyaminoamide phosphate salts, hydroxyl group-containing polycarboxylic acid esters and the modified products thereof, amides prepared in a reaction between a poly-lower alkylene imine and a free carboxyl group-containing polyester and the salts thereof. Water-soluble resins and polymer compounds such as (meth)acryl acid-styrene copolymers, (meth)acryl acid-(meth)acrylic ester copolymers, styrene-maleic acid copolymers, polyvinylalcohol, and polyvinylpyrrolidone; and polyester resins, modified polyacrylates, ethylene oxide/propylene oxide adducts, phosphoric esters, and the like may also be used. These resinic dispersing agents may be used alone or as a mixture of two or more.

The resinic dispersing agent for use in the colored composition according to the invention is preferably a polymer having an acidic or basic group, because it retains its dispersion-stabilizing effect by effectively exerting a repulsive action of the polymer, as it is adsorbed on the surface of the organic pigment and the quinoline derivatives via the acidic or basic group as an anchor. A sulfone group is favorable as the acidic group, from the point of its superior adsorption property, and an amino group is preferable as the basic group because of its superior adsorption property. In particular, a basic resinic dispersing agent having a basic group is preferable, as it is favorable in the compatibility with pigment carrier.

A comb polymer having a structure wherein a branch polymer is grafted to a backbone polymer having an acidic or basic group is preferable as the polymer having an acidic or basic group, because the polymer is more soluble in an organic solvent due to the superior steric repulsion of the branch polymer.

Further, a comb polymer having a structure wherein two or more molecules of the branch polymer are grafted to one molecule of the backbone polymer is more preferable for the reason above.

Typical examples of the basic resinic dispersing agent include polyethylene imines, polyethylene polyamines, polyxylylene-poly(hydroxypropylene)-polyamines, poly (aminomethylated) epoxy resins, copolymers of an amine-added glycidyl(meth)acrylate and (meth)acrylic acid-esterified glycidyl (meth)acrylate, and the like. These dispersing agents are prepared, for example, according to the following methods.

The polyethyleneimines can be prepared by ring-opening polymerization of an ethyleneimine in the presence of an acid catalyst. Alternatively, the polyethylene polyamines can be prepared by polycondensation of ethylene dichloride and ammonia in the presence of an alkali catalyst. The poly(aminomethylated) epoxy resins are prepared by chloromethylation of the aromatic ring in an bisphenol A-type epoxy resin, bisphenol F-type epoxy resin, phenol novolak-type epoxy resin, cresol novolak-type epoxy resin, naphthol novolak-type epoxy resin, or the like and subsequent amination of the product, and are also called Mannich bases. Specific examples of the amines used in amination include monomethylamine, monoethylamine, monomethanolamine, monoethanolamine, dimethylamine, diethylamine, dimethanolamine, and diethanolamine.

The amine-added glycidyl(meth)acrylate and (meth) acrylic acid-esterified glycidyl(meth)acrylate copolymers are prepared by polymerizing glycidyl (meth)acrylate in radical polymerization, adding an amine similar to that described above to part of the epoxy groups in the polymer, forming a poly(amine-added glycidyl(meth)acrylate), and allowing the residual epoxy groups to react with a carboxylic acid, (meth) acryl acid, in an esterification reaction.

The branch polymer is preferably soluble in organic solvents, and typical examples thereof include polymers having a carboxylic acid at the polymer terminal that forms a graft bond in an amidation reaction with the amino group in the backbone polymer, such as poly(12-hydroxystearic acid), polyricinoleic acid, and a ring-opening polymer of ϵ-caprolactone, or the like. In addition, if the backbone polymer has a vinyl group as in the amine-added glycidyl (meth)acrylate-(meth)acrylic acid-esterified glycidyl (meth)acrylate copolymer, poly[methyl(meth)acrylate], poly[ethyl(meth)acrylate] or the like that reacts with the vinyl group in graft polymerization may be used as the branch polymer. These polymers are prepared, for example, according to the following methods.

Poly(12-hydroxystearic acid) is produced in a dehydration polycondensation polyesterification reaction of 12-hydroxystearic acid. Polyricinoleic acid is produced similarly in a dehydration polycondensation polyesterification reaction of ricinoleic acid. The ring-opening polymers from ϵ-caprolactone are produced by the ring-opening polymerization initiated by addition of a fatty monocarboxylic acid, n-caproic acid, to ϵ-caprolactone.

The resinic dispersing agent may be used in an amount of 0.1 to 30% by weight with respect to organic pigments.

As described above, the pigment carrier in the colored composition according to the invention contains a transparent resin, a precursor thereof, or a mixture thereof. The transparent resin preferably is a resin having a transmission coefficient preferably of 80% or more and more preferably of 95% or more over the entire visible light range of 400 to 700 nm. The transparent resins include thermoplastic and thermosetting resins and photosensitive resins; the precursors thereof contain a monomer or an oligomer that generates a transparent resin after radiation-ray irradiation; and the transparent resins may be used alone or as a mixture of two or more.

The colored composition for color filters according to the invention contains additionally a photopolymerization initiator or the like, if it is hardened by UV irradiation.

Examples of the thermoplastic resin include butyral resins, styrene-maleic acid copolymers, chlorinated polyethylenes, chlorinated polypropylenes, polyvinyl chloride, vinyl chloride-vinyl acetate copolymers, polyvinyl acetate, polyurethane resins, polyester resins, acrylic resins, alkyd resins, polystyrene resins, polyamide resins, rubber resins, cyclized rubber resins, cellulose, polybutadiene, polyethylene, polypropylene, and polyimide resins. Alternatively, examples of the thermosetting resin include epoxy resins, benzoguanamine resins, rosin-modified maleic acid resins, rosin-modified fumaric acid resins, melamine resins, urea resins, and phenol resins.

Examples of the photosensitive resin include linear polymer resins having a photocrosslinkable group such as (meth) acryloyl and styryl, which are produced by introducing a (meth)acrylic compound or cinnamic acid having a reactive substituent such as an isocyanate group, an aldehyde group, or an epoxy group into a linear polymer having a reactive substituent such as a hydroxyl group, a carboxyl group, or an amino group. In addition, polymers obtained by partial esterification of a styrene-maleic anhydride copolymer or a linear polymer containing an acid anhydride such as an α-olefin-maleic anhydride copolymer with a hydroxyl group-containing (meth)acrylic compound such as hydroxyalkyl(meth) acrylate are also used.

Examples of the monomer and oligomer include various acrylic and methacrylic acid esters such as 2-hydroxyethyl (meth)acrylate, 2-hydroxypropyl (meth)acrylate, cyclohexyl (meth)acrylate, polyethylene glycol di(meth)acrylate, pentaerythritol tri(meth)acrylate, dipentaerythritol hexa(meth) acrylate, tricyclodecanyl(meth)acrylate, melamine(meth) acrylate, and epoxy(meth)acrylate; (meth)acryl acid; styrene; vinyl acetate; (meth)acrylamide; N-hydroxymethyl(meth) acrylamide; and acrylonitrile.

The pigment carrier preferably contains a copolymer resin of a compound (a) represented by the above general formula (3) and a compound (b) having another ethylenically unsaturated double bond. The content of the compound (a) in the copolymer resin is preferably 0.1 to 50 wt % and more preferably 10 to 35 wt %. A compound (a) content of less than 10 wt % may lead to decrease in pigment dispersion efficiency, and a content of still less than 0.1 wt % to an insufficient dispersion efficiency. Alternatively, a compound (a) content of more than 35 wt % may lead to increase in hydrophobicity and deterioration in the printing efficiency of the photosensitive colored composition and cause increase in the amount of residues; and a content of further more than 50 wt % to drastic decrease in the compatibility with the other constituent components in the photosensitive colored composition, resulting in precipitation of the monomer and the photopolymerization initiator.

The weight-average molecular weight (Mw) of the copolymer resin (copolymer) is preferably 5,000 to 100,000 and more preferably 10,000 to 50,000.

The copolymer resin is highly effective in dispersing pigment and plays roles of preventing aggregation of the pigment in the colored composition and retaining the state in which the pigment is finely dispersed, and thus is an important ingredient for producing color filters with fewer pigment aggregates, higher in transmission coefficient, and superior in color tone.

The compound (a) represented by General formula (3), a constituent component of the copolymer resin, is more favorably adsorbed and oriented on the pigment surface due to the effect of π-electrons in the benzene ring of the compound (a). In particular, when the compound (a) is the ethylene oxide (hereinafter, referred to as EO) of p-cumylphenol or a propylene oxide (hereinafter, referred to as PO)-modified (meth) acrylate, the compound (a) is more effective as it allows formation of a surface more favorable for adsorption and orientation on the pigment by its steric effect. In General formula (3), the alkyl group represented by $R_3$ preferably has 1 to 20 carbons and more preferably 1 to 10 carbons. An alkyl group having 1 to 10 carbons inhibits approach of resins to each other because of the steric hindrance due to the alkyl group and facilitates adsorption/orientation on the pigment. However, an alkyl group having more than 10 carbons inhibits further the adsorption/orientation of its benzene ring on the pigment surface because of the excessively increased steric hindrance of the alkyl group. This tendency become more significant when the alkyl chain is further elongated, and an alkyl group having more than 20 carbons reduces the adsorption/orientation of the benzene ring significantly. In General formula (3), the alkylene group represented by $R_2$ usually has 1 to 5 carbon atoms and preferably 2 to 3 carbon atoms. In General formula (3), n is preferably an integer of 1 to 5.

Examples of the compound (a) include phenol EO-modified (meth)acrylates, p-cumylphenol EO-modified (meth)

acrylates, nonylphenol EO-modified (meth)acrylates, and nonylphenol PO-modified (meth)acrylates.

Examples of the compound (b) include (meth)acryl acid, methyl(meth)acrylate, ethyl(meth)acrylate, (iso)propyl (meth)acrylate, (iso)butyl(meth)acrylate, (iso)pentyl(meth) acrylate, 2-hydroxyethyl (meth)acrylate, 2-hydroxypropyl (meth)acrylate, benzyl (meth)acrylate, cyclohexyl(meth) acrylate, glycidyl (meth)acrylate, isobonyl(meth)acrylate, acid phosphoxyethyl(meth)acrylate, acid phosphoxypropyl (meth)acrylate, 3-chloro-2-acid phosphoxyethyl (meth)acrylate, and acid phosphoxypolyethylene glycol mono(meth) acrylate.

The pigment carrier is used in an amount preferably of 50 to 700% and more preferably of 100 to 400% by weight with respect to the organic pigments.

Examples of the photopolymerization initiator contained in the colored composition for color filters according to the invention when it is hardened by UV irradiation include acetophenone photopolymerization initiators such as 4-phenoxy-dichloroacetophenone, 4-t-butyl-dichloroacetophenone, diethoxyacetophenone, 1-(4-isopropylphenyl)-2-hydroxy-2-methyl propan-1-one, 1-hydroxycyclohexylphenylketone, and 2-benzyl-2-dimethylamino-1-(4-morpholinophenyl)-butan-1-one; benzoin photopolymerization initiators such as benzoin, benzoin methylether, benzoin ethylether, benzoin (iso)propylether, and benzyldimethyl ketal; benzophenone photopolymerization initiators such as benzophenone, benzoylbenzoic acid, benzoylmethyl benzoate, 4-phenylbenzophenone, hydroxybenzophenone, acylated benzophenones, and 4-benzoyl-4'-methyl diphenylsulfide; thioxanthone photopolymerization initiators such as thioxanthone, 2-chlorothioxanthone, 2-methylthioxanthone, isopropylthioxanthone, and 2,4-diisopropylthioxanthone; triazine photopolymerization initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphto-1-yl)-4,6-bis(trichloromethyl)-s-triazine, 2-(4-methoxy-naphto-1-yl)-4,6-bis(trichloromethyl)-s-triazine, 2,4-trichloromethyl-(piperonyl)-6-triazine, and 2,4-trichloromethyl(4'-methoxy styryl)-6-triazine; borate photopolymerization initiators; carbazole photopolymerization initiators; and imidazole photopolymerization initiators. The photopolymerization initiator may be used in an amount of 5 to 150% by weight with respect to the organic pigments.

The photopolymerization initiators are used alone or as a mixture of two or more, but may be used in combination with a sensitizer, such as α-acyloxy ester, acylphosphine oxide, methylphenyl glyoxylate, benzil, 9,10-phenanthrenequinone, camphorquinone, ethyl anthraquinone, 4,4'-diethylisophthalophenone, 3,3',4,4'-tetra(t-butylperoxycarbonyl) benzophenone, and 4,4'-diethylaminobenzophenone. The sensitizer may be used in an amount of 0.1 to 30% by weight with respect to the photopolymerization initiator.

The colored composition according to the invention is produced, for example, by dispersing an organic pigment in a pigment carrier solution or by preparing a pigment dispersion containing an organic pigment in water or an organic solvent and mixing the dispersion with a pigment carrier solution. The method of dispersing the pigment is not particularly limited, but the method of using a bead mill, a sand mill, a ball mill, a three-roll mill, a two-roll mill, or the like is preferable. The pigment-dispersing agent containing an organic pigment and that containing the quinoline derivatives may be dispersed separately in a pigment carrier solution and the resulting dispersions then blended, but for improvement in the efficiency of dispersing the organic pigment, it is preferable to add a pigment-dispersing agent containing quinoline derivatives when the organic pigment is dispersed.

When the organic pigment is dispersed in the pigment carrier, dispersion aids such as surfactants and other dyestuff derivatives may be used together.

Examples of the surfactant include anionic surfactants such as sodium laurylsulfate, polyoxyalkylene alkylether sulfate salts, sodium dodecylbenzenesulfonate, alkali salts of styrene-acryl acid copolymers, sodium stearate, sodium alkylnaphthalenesufonate, sodium alkyldiphenyletherdisufonates, laurylsulfuric acid monoethanolamine, laurylsulfuric acid triethanolamine, ammonium laurylsulfate, stearic acid monoethanolamine, sodium stearate, sodium laurylsulfate, monoethanolamine salts of styrene-acryl acid copolymers, and polyoxyalkylene alkylether phosphoric acid esters; nonionic surfactants such as polyoxyalkylene oleylethers, polyoxyalkylene laurylethers, polyoxyalkylene nonylphenylethers, polyoxyalkylene alkylether phosphoric acid esters, polyoxyalkylene sorbitan monostearates, and polyethylene glycol monolaurate; cationic surfactants such as quaternary alkyl ammonium salts and ethylene oxide adducts thereof; alkyl betaines such as alkyldimethylaminoacetic acid betaines; and amphoteric surfactants such as alkylimidazolines. These surfactants may be used alone or as a mixture of two or more.

The other dyestuff derivatives used as dispersion aid are compounds of organic dyes having a substituent group. Such organic dyes also include pale yellow aromatic polycyclic compounds such as naphthalene-based and anthraquinone-based compounds, which are not generally called dyes. The dyestuff derivatives also include those described in Jpn. Pat. Appln. KOKAI Publication No. 63-305173, Jpn. Pat. Appln. KOKOKU Publication Nos. 57-15620, 59-40172, 63-17102, and 5-9469, and others. In particular, dyestuff derivatives having the basic group containing a triazine ring are favorably used, as they are effective in pigment dispersion.

Typical examples of the basic group contained in the dyestuff derivative include substituents represented by the following general formulae (4), (5), (6) and (7).

General formula (4):

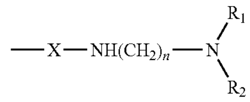

General formula (5):

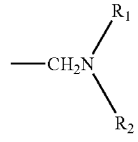

General formula (6):

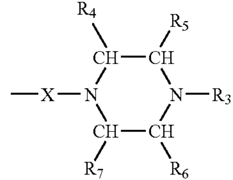

-continued

General formula (7):

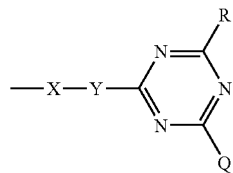

In General formulae (4) to (7), X represents —$SO_2$—, —CO—, —$CH_2NHCOCH_2$—, —$CH_2$— or a single bond. Preferably, X represents —$SO_2$— or a single bond.

n is an integer of 1 to 10. Preferably, n is an integer of 1 to 3.

$R_1$ and $R_2$ each independently represent an unsubstituted or substituted alkyl group, an unsubstituted or substituted alkenyl group, or an unsubstituted or substituted phenyl group; or $R_1$ and $R_2$ may bind to each other forming an unsubstituted or substituted heterocyclic ring additionally containing a nitrogen, oxygen or sulfur atom. The unsubstituted or substituted alkyl group represented by $R_1$ or $R_2$ normally has 1 to 36 carbon atoms. Alternatively, the unsubstituted or substituted alkenyl group represented by $R_1$ or $R_2$ normally has 2 to 36 carbon atoms. $R_1$ and $R_2$ each are preferably an unsubstituted or substituted alkyl group having 1 to 5 carbon atoms.

$R_3$ represents an unsubstituted or substituted alkyl group, an unsubstituted or substituted alkenyl group, or an unsubstituted or substituted phenyl group. The unsubstituted or substituted alkyl group represented by $R_3$ normally has 1 to 36 carbons. Alternatively, the unsubstituted or substituted alkenyl group represented by $R_3$ normally has 2 to 36 carbons. $R_3$ is preferably an unsubstituted or substituted alkyl group having 1 to 4 carbon atoms.

$R_4$, $R_5$, $R_6$, and $R_7$ each independently represent a hydrogen atom, a substituted or unsubstituted alkyl group, a substituted or unsubstituted alkenyl group, or a substituted or unsubstituted phenyl group. The substituted or unsubstituted alkyl group represented by $R_4$, $R_5$, $R_6$, or $R_7$ normally has 1 to 36 carbon atoms. Alternatively, the substituted or unsubstituted alkenyl group represented by $R_4$, $R_5$, $R_6$, or $R_7$ normally has 2 to 36 carbon atoms. $R_4$, $R_5$, $R_6$ and $R_7$ each are preferably an unsubstituted or substituted alkyl group having 1 to 4 carbon atoms.

Y represents —$NR_8$-Z-$NR_9$— or a single bond.

$R_8$ and $R_9$ each independently represent a hydrogen atom, a substituted or unsubstituted alkyl group, a substituted or unsubstituted alkenyl group, or a substituted or unsubstituted phenyl group. The substituted or unsubstituted alkyl group represented by $R_8$ or $R_9$ normally has 1 to 36 carbon atoms. Alternatively, the substituted or unsubstituted alkenyl group represented by $R_8$ or $R_9$ normally has 2 to 36 carbon atoms. $R_8$ and $R_9$ each are preferably a hydrogen atom.

Z represents an unsubstituted or substituted alkylene group, an unsubstituted or substituted alkenylene group, or an unsubstituted or substituted phenylene group. The substituted or unsubstituted alkyl group represented by Z normally has 1 to 36 carbon atoms. Alternatively, the substituted or unsubstituted alkenyl group represented by Z normally has 2 to 36 carbon atoms. Z is preferably an unsubstituted or substituted phenylene group.

R represents a substituent group represented by the following general formula (8) or a substituent group represented by the following general formula (9).

Q represents a hydroxyl group, an alkoxyl group, a substituent group represented by the following general formula (8) or a substituent group represented by the following general formula (9). Q is preferably a substituent group represented by the following general formula (8).

General formula (8):

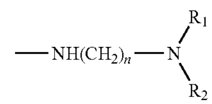

General formula (9):

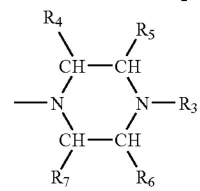

In General formulae (8) and (9), $R_1$ to $R_7$ and n are the same as those defined in General formulae (4) to (6).

Examples of the organic dye composing the dyestuff derivative having a basic group include diketopyrrolopyrrole dyes, azo, disazo, and polyazo dyes, phthalocyanine dyes, anthraquinone dyes such as diaminodianthraquinone, anthrapyrimidine, fravantrone, anthanthrone, indanthron, pyranthron and violanthrone, quinacridone dyes, dioxazine dyes, perynone dyes, perylene dyes, thioindigo dyes, isoindoline dyes, isoindolinone dyes, quinophthalone dyes, threne dyes, and metal complex dyes. In addition, the organic pigments exemplified above are also included.

The triazine composing the triazine derivative having a basic group is a 1,3,5-triazine that may have a substituent: for example, an alkyl group such as methyl or ethyl; an amino or alkylamino group such as dimethylamino, diethylamino, or dibutylamino; a nitro group; a hydroxyl or alkoxy group such as methoxy, ethoxy, or butoxy group; a halogen atom such as chlorine; a phenyl group substituted with a methyl group, a methoxy group, an amino group, a dimethylamino group, a hydroxyl group, or the like; or a phenylamino group that may be substituted with a methyl group, an ethyl group, a methoxy group, an ethoxy group, an amino group, a dimethylamino group, a diethylamino group, a nitro group, a hydroxyl group, or the like.

The dyestuff derivatives having a basic group can be prepared via a variety of synthetic pathways. For example, the dyestuff derivatives are produced by introducing a substituent group represented by one of the following formulae (10) to (13) into an organic dye, and allowing an amine component, for example, N N-dimethylaminopropylamine, N-methylpiperazine, diethylamine, or 4-[4-hydroxy-6-[3-(dibutylamino) propylamino]-1,3,5-triazin-2-ylamino]aniline, to react with the substituent group forming a substituent group represented by one of General formulae (4) to (7).

—$SO_2Cl$ Formula (10)

—COCl Formula (11)

—$CH_2NHCOCH_2Cl$ Formula (12)

—$CH_2Cl$ Formula (13)

When the organic dye is an azo dye, the azo pigment derivative having a basic group can also be produced by introducing a substituent group represented by one of General formulae (4) to (7) into a diazo or coupling component and then subjecting the product to a coupling reaction.

The dispersion aid may be used in an amount of 0.1 to 30% by weight with respect to the organic pigment.

The triazine derivatives having a basic group according to the invention can be prepared via a variety of synthetic pathways. The triazine derivative is produced, for example, by using a cyanuric chloride as the starting material, allowing an amine component that replaces at least one chlorine of cyanuric chloride with a substituent group represented by one of Formulae (4) to (7), for example, N,N-dimethylaminopropylamine, or N-methylpiperazine, and then allowing various amines, alcohols, or the like to react with the other chlorines on the cyanuric chloride.

Examples of the amine components used for forming substituent groups represented by General formulae (4) to (9) include dimethylamine, diethylamine, N,N-ethylisopropylamine, N,N-ethylpropylamine, N,N-methylbutylamine, N,N-methylisobutylamine, N,N-butylethylamine, N,N-tert-butylethylamine, diisopropylamine, dipropylamine, N,N-sec-butylpropylamine, dibutylamine, di-sec-butylamine, diisobutylamine, N,N-isobutyl-sec-butylamine, diamylamine, diisoamylamine, dihexylamine, di(2-ethylhexyl) amine, dioctylamine, N,N-methyloctadecylamine, didodecylamine, diallyamine, N,N-ethyl-1,2-dimethylpropylamine, N,N-methylhexylamine, dioleylamine, distearylamine, N,N-dimethylaminomethylamine, N,N-dimethylaminoethylamine, N,N-dimethylaminoamylamine, N,N-dimethylaminobutylamine, N,N-diethylaminoethylamine, N,N-diethylaminopropylamine, N,N-diethylaminohexylamine, N,N-diethylaminobutylamine, N,N-diethylaminopentylamine, N,N-dipropylaminobutylamine, N,N-dibutylaminopropylamine, N,N-dibutylaminoethylamine, N,N-dibutylaminobutylamine, N,N-diisobutylaminopentylamine, N,N-methyl-laurylaminopropylamine, N,N-ethylhexylaminoethylamine, N,N-distearylaminoethylamine, N,N-dioleylaminoethylamine, N,N-distearylaminobutylamine, piperidine, 2-pipecoline, 3-pipecoline, 4-pipecoline, 2,4-lupetidine, 2,6-lupetidine, 3,5-lupetidine, 3-piperidine methanol, pipecolinic acid, isonipecotic acid, methyl isonipecotate, ethyl isonipecotate, 2-piperidineethanol, pyrrolidine, 3-hydroxypyrrolidine, N-aminoethylpiperidine, N-aminoethyl-4-pipecoline, N-aminoethylmorpholine, N-aminopropylpiperidine, N-aminopropyl-2-pipecoline, N-aminopropyl-4-pipecoline, N-aminopropylmorpholine, N-methylpiperazine, N-butylpiperazine, N-methylhomopiperazine, 1-cyclopentylpiperazine, 1-amino-4-methylpiperazine, and 1-cyclopentylpiperazine.

The other dyestuff derivatives include, but are not limited to, the following dyestuff derivatives 1 to 53. The dyestuff derivatives may be used alone or as a mixture of two or more.

Dyestuff derivative 1

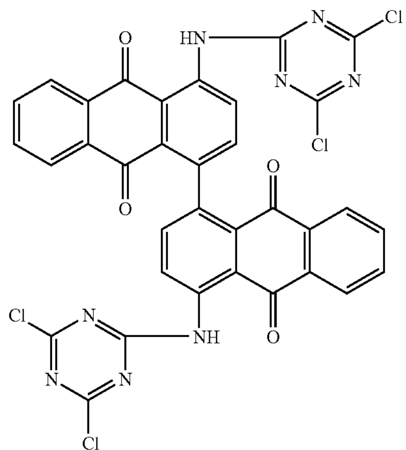

Dyestuff derivative 2

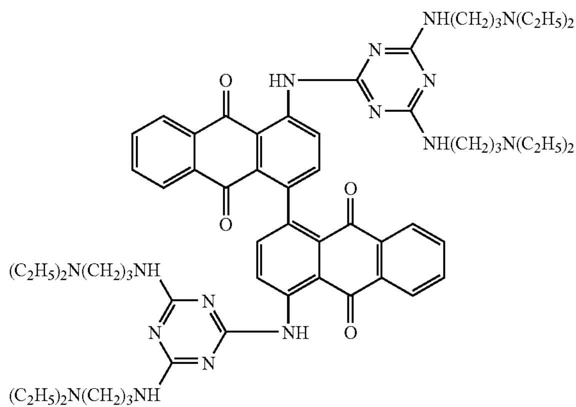

-continued
Dyestuff derivative 3
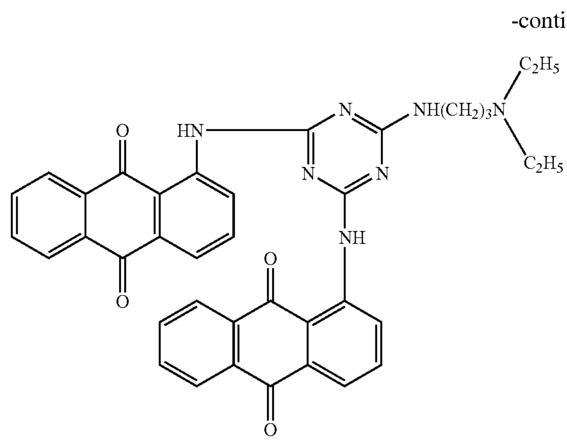
Dyestuff derivative 4
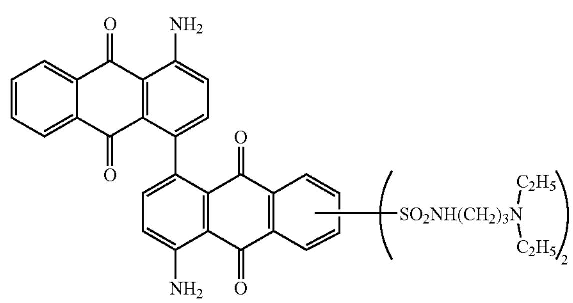
Dyestuff derivative 5
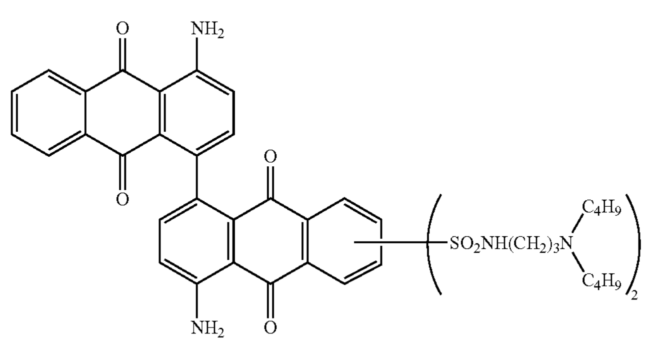
Dyestuff derivative 6
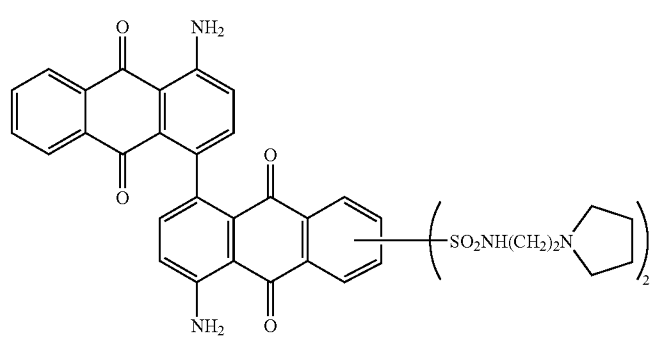
Dyestuff derivative 7
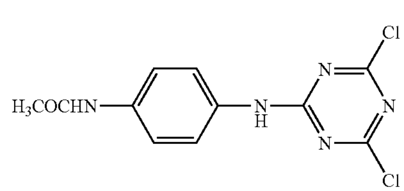

-continued
Dyestuff derivative 8
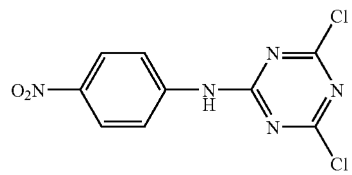
Dyestuff derivative 9
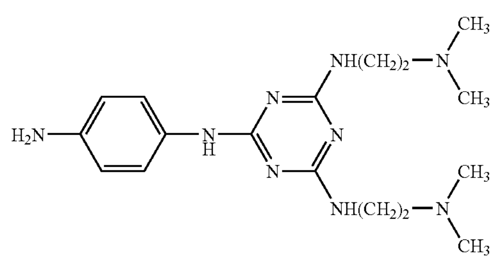
Dyestuff derivative 10
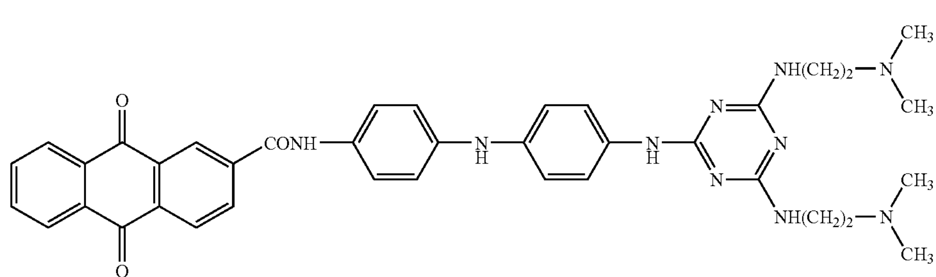
Dyestuff derivative 11
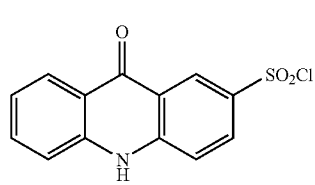
Dyestuff derivative 12
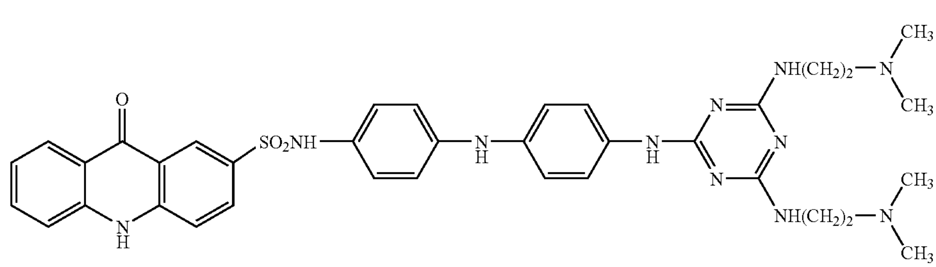
Dyestuff derivative 13
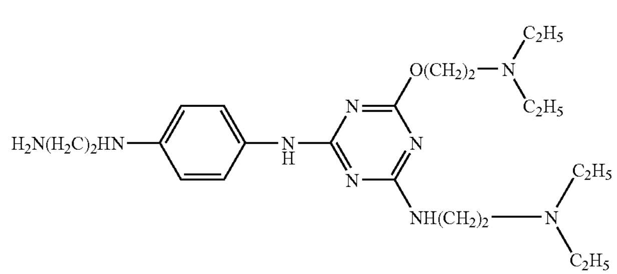
Dyestuff derivative 14
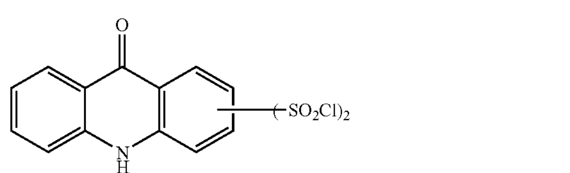

-continued
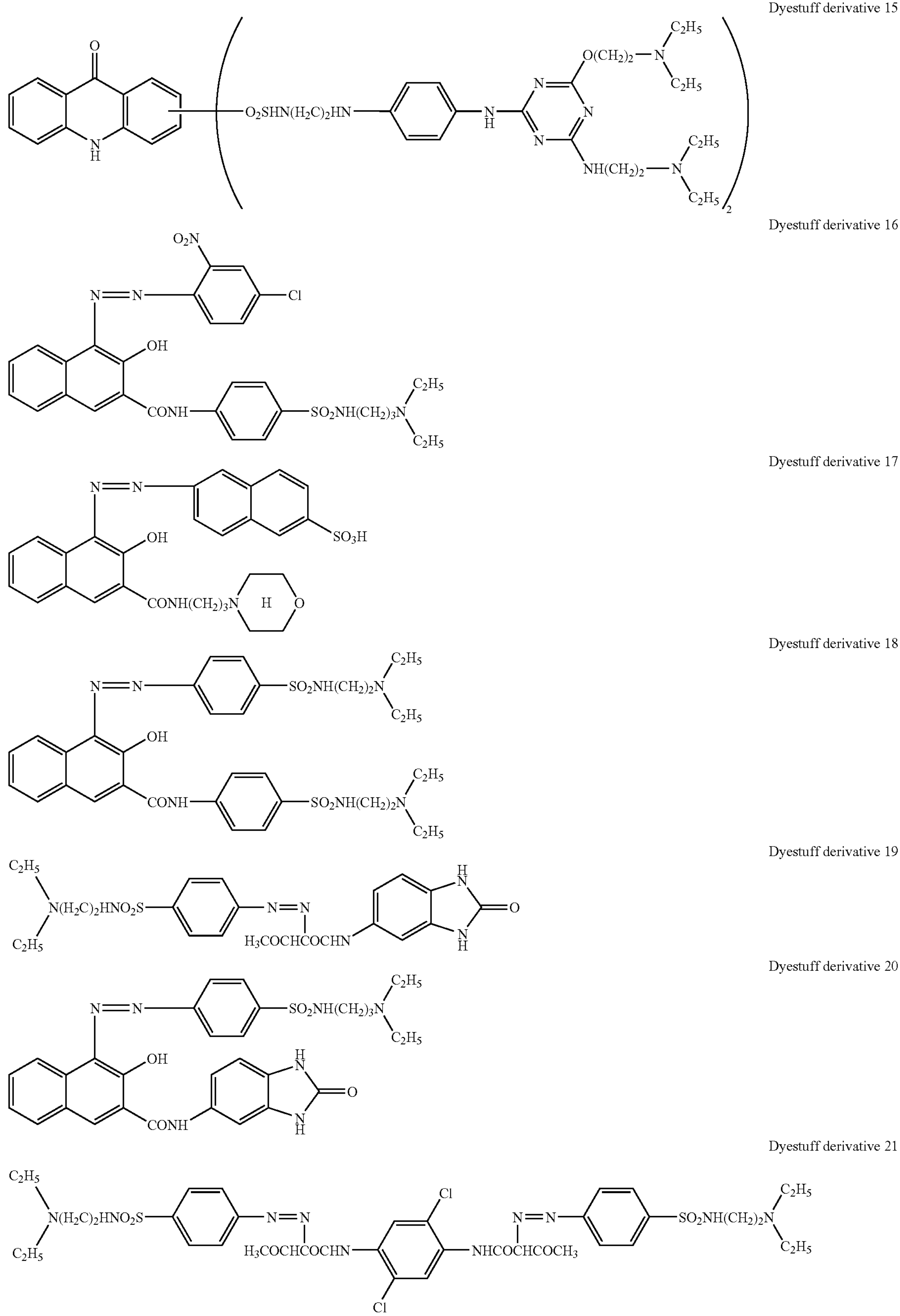

-continued
Dyestuff derivative 22
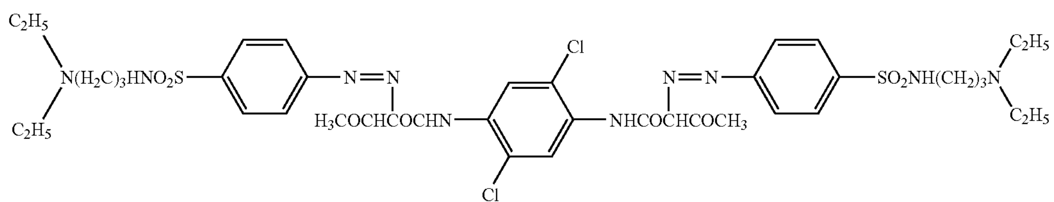
Dyestuff derivative 23
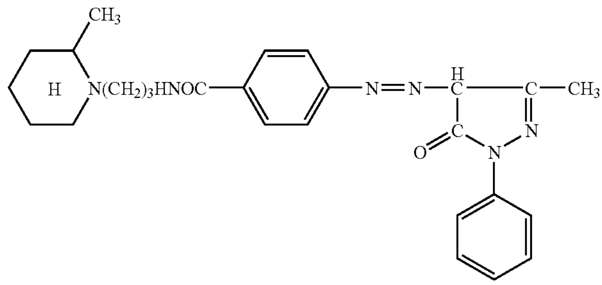
Dyestuff derivative 24
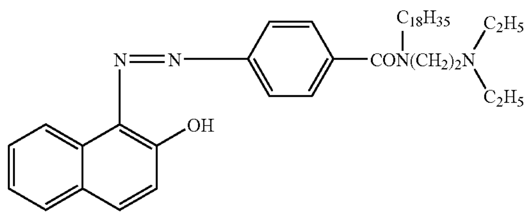
Dyestuff derivative 25
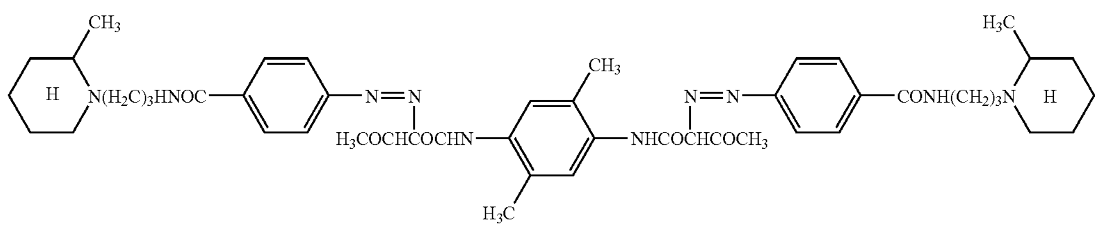
Dyestuff derivative 26
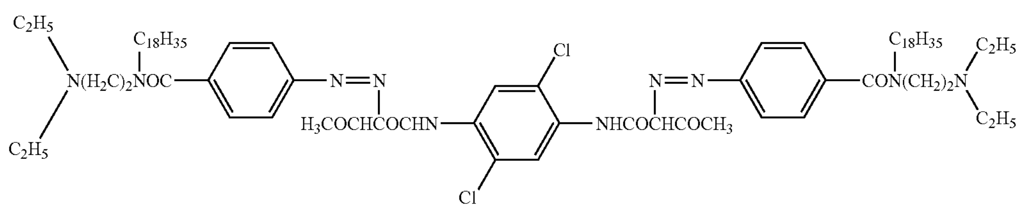
Dyestuff derivative 27
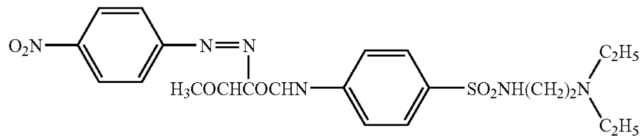
Dyestuff derivative 28
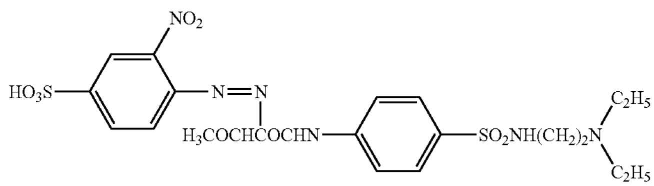

-continued
Dyestuff derivative 29
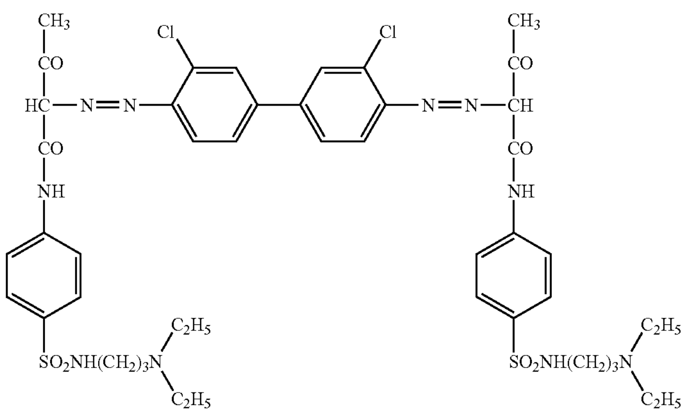
Dyestuff derivative 30
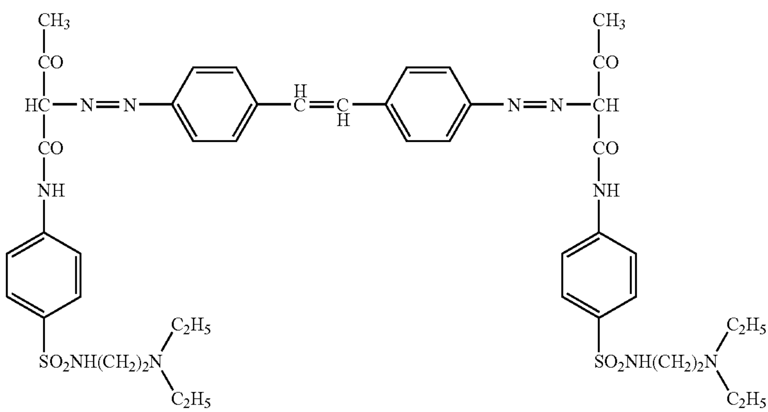
Dyestuff derivative 31
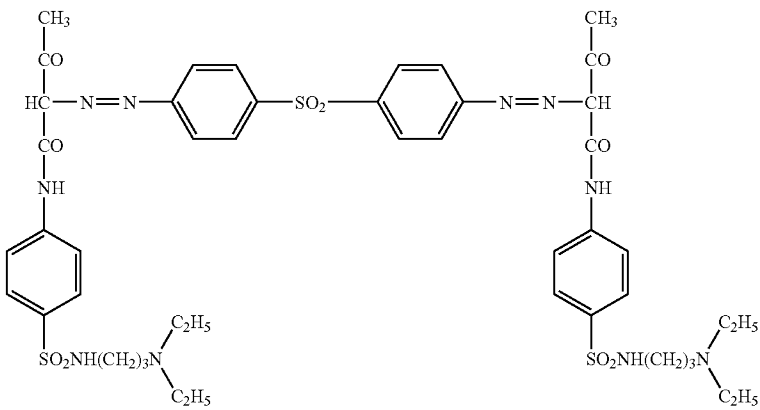
Dyestuff derivative 32
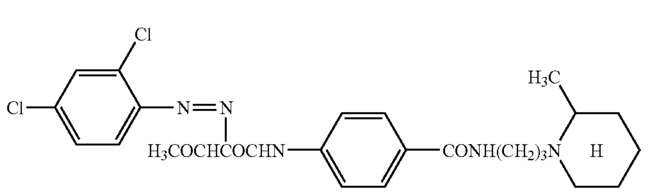
Dyestuff derivative 33
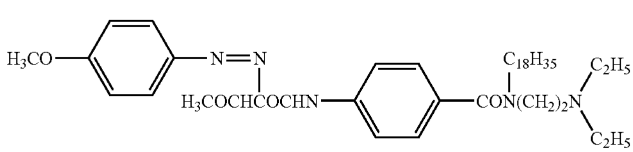

-continued
Dyestuff derivative 34
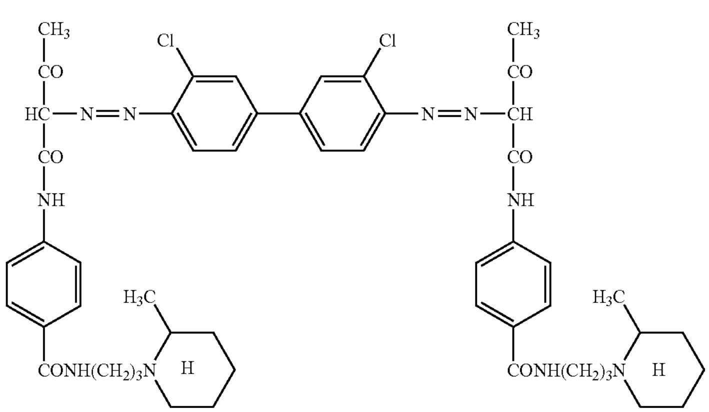
Dyestuff derivative 35
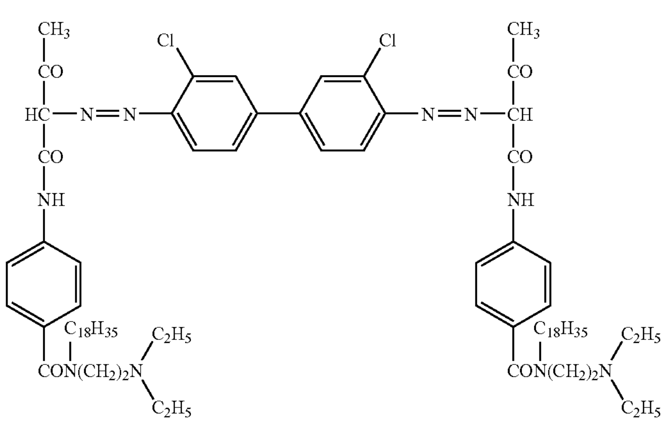
Dyestuff derivative 36
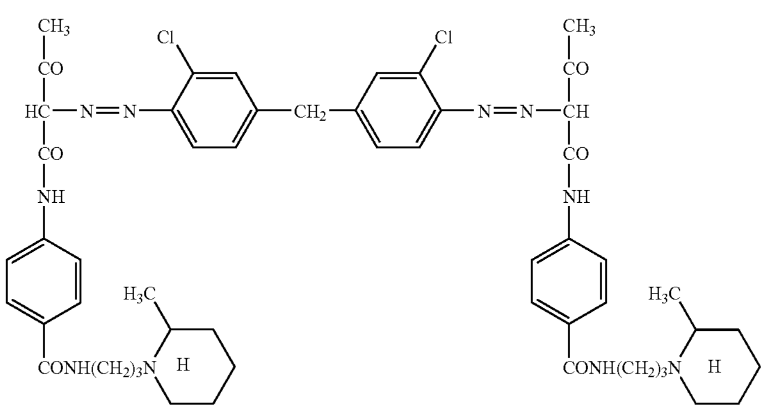
Dyestuff derivative 37
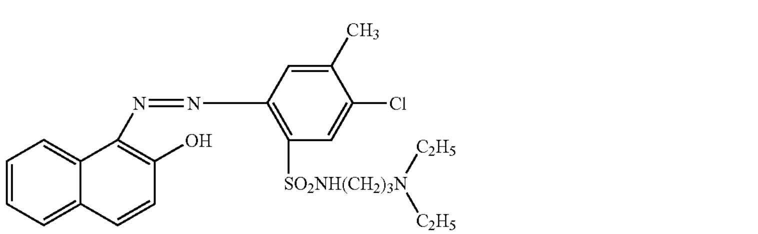
Dyestuff derivative 38
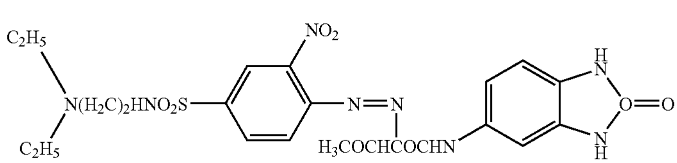

-continued
Dyestuff derivative 39
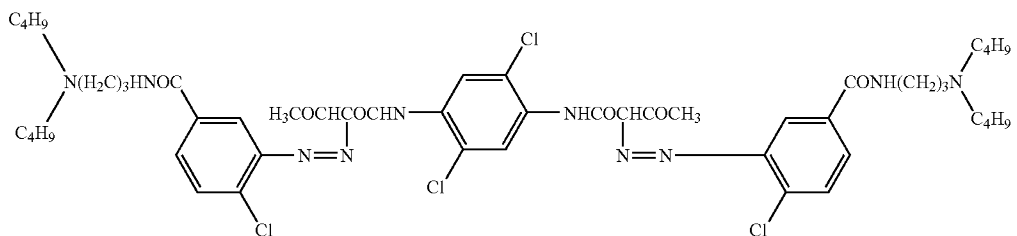
Dyestuff derivative 40
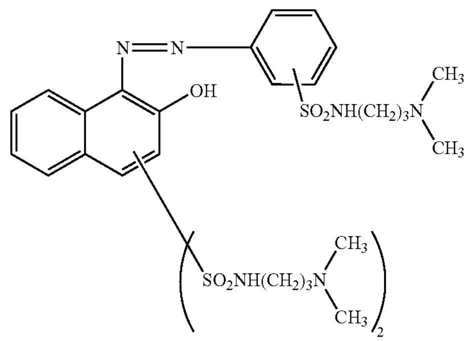
Dyestuff derivative 41
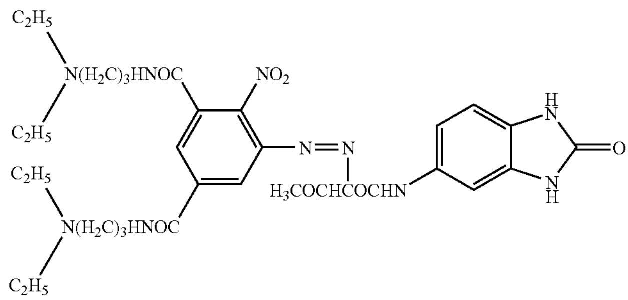
Dyestuff derivative 42
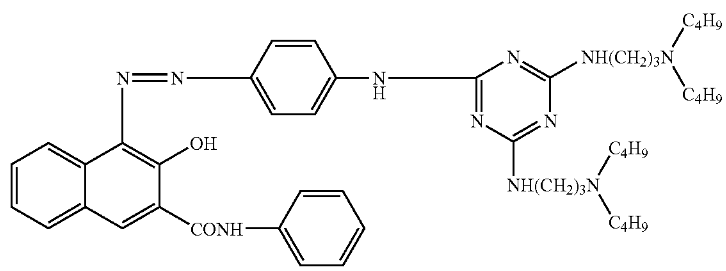
Dyestuff derivative 43
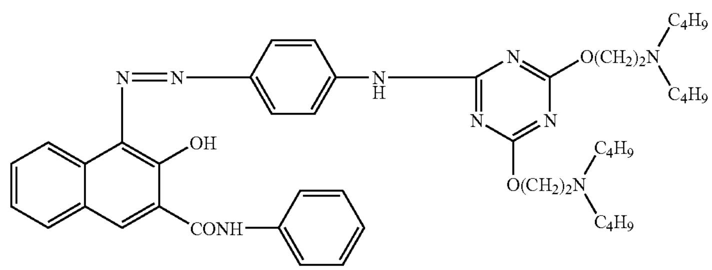

-continued
Dyestuff derivative 44
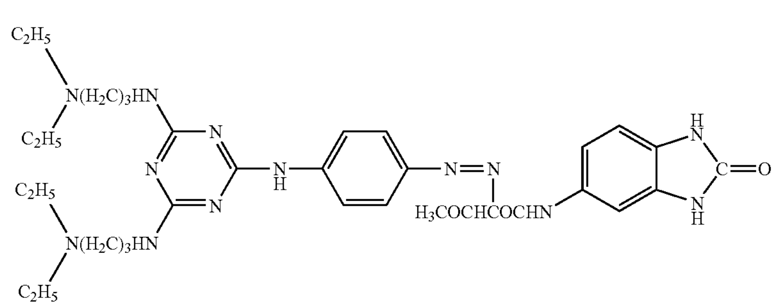
Dyestuff derivative 45
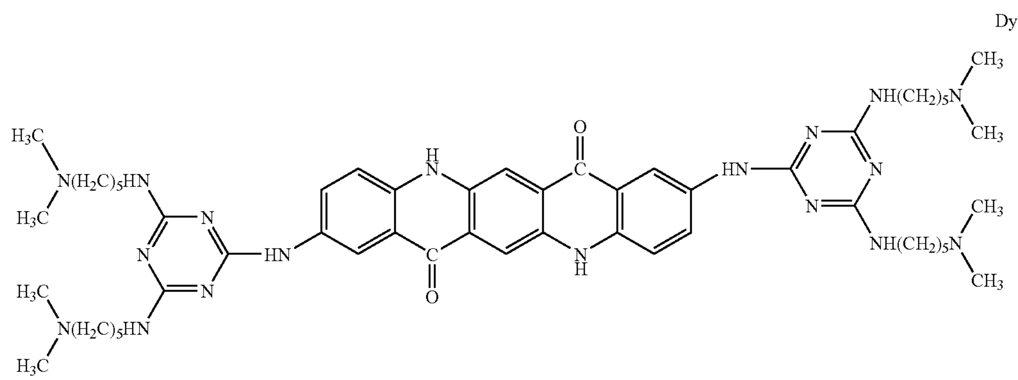
Dyestuff derivative 46
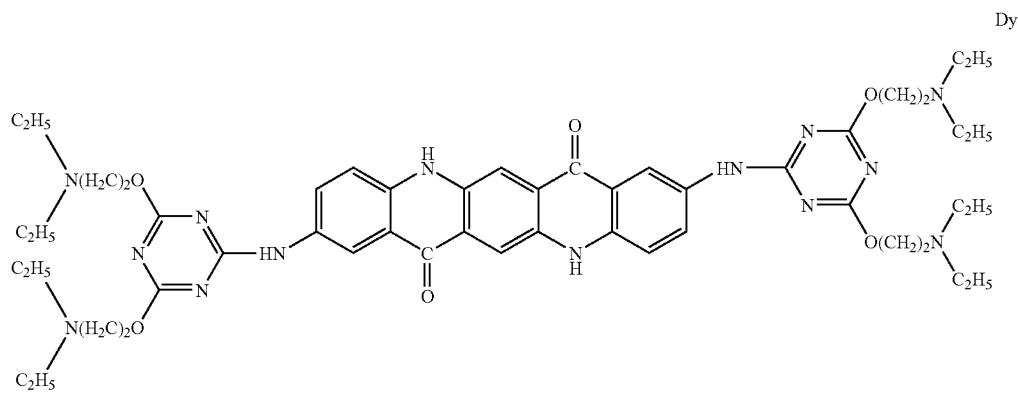
Dyestuff derivative 47
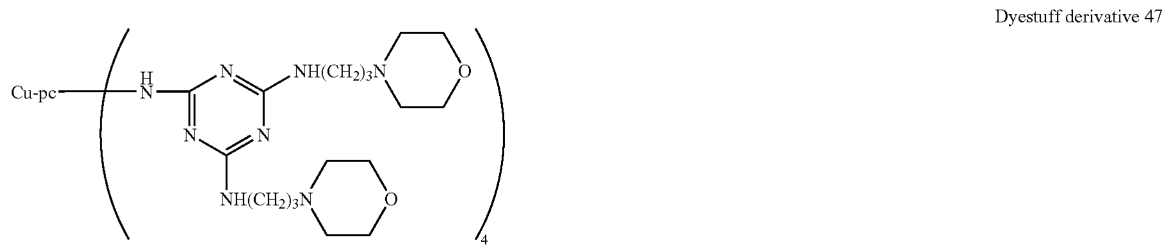
Cu-Pc; Copper phthalocyanine residue -continued
Dyestuff derivative 48
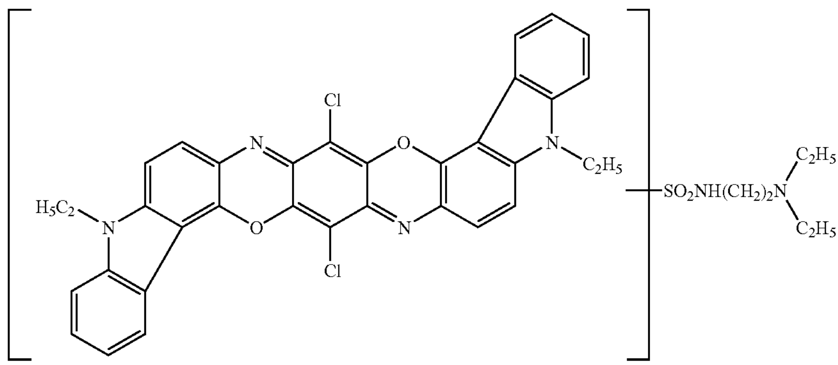
Dyestuff derivative 49
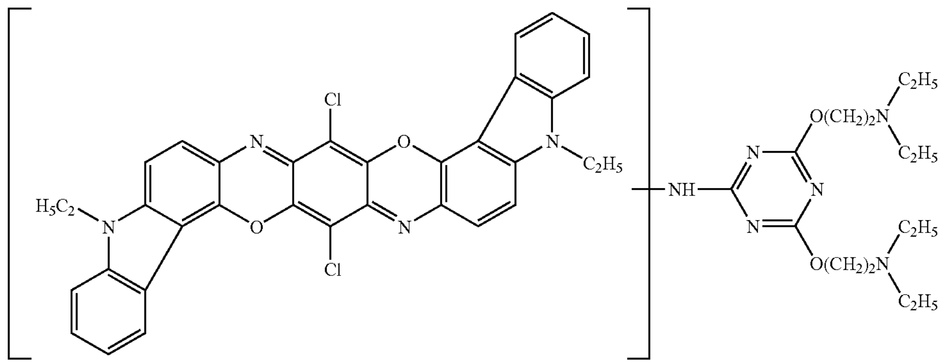
Dyestuff derivative 50
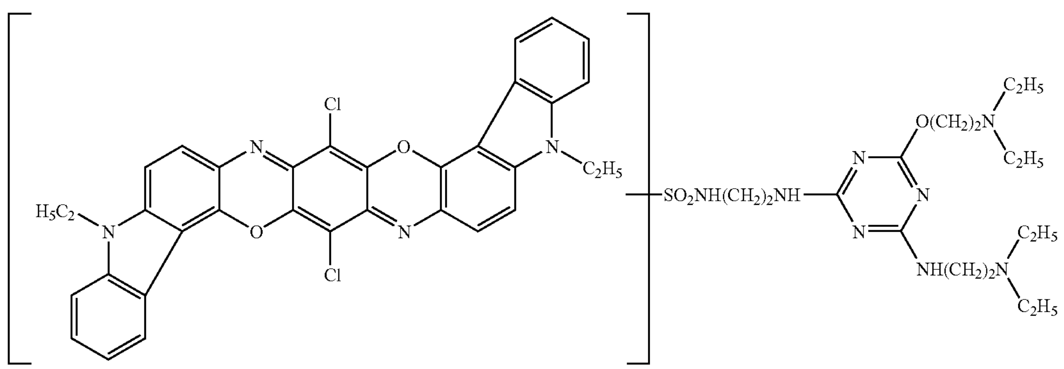
Dyestuff derivative 51
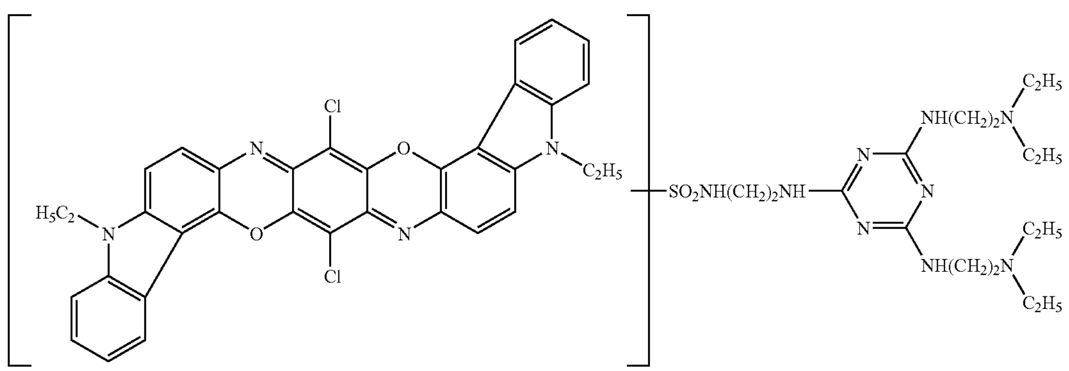

-continued

Dyestuff derivative 52

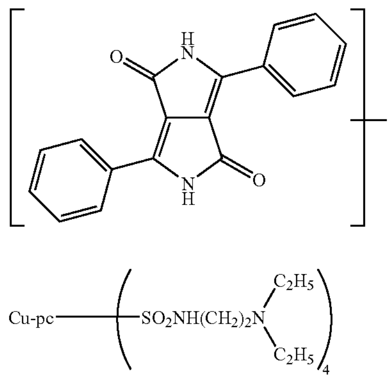

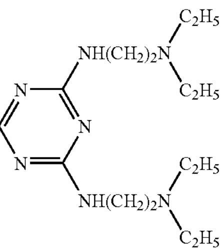

Dyestuff derivative 53

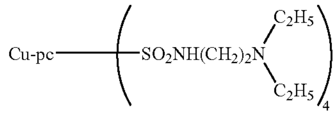

Cu-Pc; Copper Phthalocyanine Residue

A solvent may be added to the colored composition according to the invention in order to make it easier to apply the composition on a transparent substrate such as a glass substrate to a dried film thickness of 1 to 2.5 μm and thus form a filter segment. Examples of the solvent include cyclohaxanone, ethylcellosolve acetate, butylcellosolve acetate, 1-methoxy-2-propyl acetate, diethyleneglycol dimethylether, ethylbenzene, ethylene glycol diethylether, xylene, ethylcellosolve, methyl-n-amylketone, propylene glycol monomethylether, toluene, methylethylketone, ethyl acetate, methanol, ethanol, isopropyl alcohol, butanol, isobutyl ketone, and petroleum solvent. These solvents may be used alone or as a mixture. The total amount of the solvents used is 500 to 4,000% by weight with respect to the organic pigment.

The colored composition according to the invention may be prepared in the forms of gravure offset printing ink, dry offset printing ink, silk-screen printing ink, solvent- or alkali-development-type color resist. The color resist is a dispersion of an organic pigment and a pigment-dispersing agent of quinoline derivatives in a composition containing the thermosetting resin, thermoplastic resin or photosensitive resin, the monomer, and the photopolymerization initiator.

The organic pigment is preferably used in an amount of 1.5 to 7 wt % in the colored composition when a filter segment is formed by photolithography, and in an amount of 1.5 to 40 wt % when the filter segment is formed by a printing process. Anyhow, the organic pigment is contained in the final filter segment in an amount preferably of 10 to 40 wt % and more preferably of 20 to 40 wt %, and the other component remaining in the filter segment is essentially the resin binder from the pigment carrier.

Bulky particles of 5 μm or more in size, preferably those of 1 μm or more, and more preferably those of 0.5 μm or more, and dust contaminants in the photosensitive colored composition according to the invention are removed by means of a centrifugal separator, a sintered filter, a membrane filter, or the like.

Pigment dispersion stability of a colored composition for color filters is generally evaluated by measuring its yield value. The yield value is determined by measuring the viscosities of a colored composition for color filters at different shear rates and calculating according to the Casson's Equation. A smaller yield value indicates a smaller amount of pigment aggregation. Because the aggregation of pigments is undesirable, a smaller yield value is more preferable. Accordingly, the yield value of the colored composition for color filters according to the invention is preferably $1\times10^{-2}$ Pa or less and more preferably $1\times10^{-3}$ Pa or less.

Hereinafter, color filters are described.

The color filter according to the invention contains a transparent or reflective substrate and filter segments formed thereon in three different colors, R (red), G (green), and B (blue), or Y (yellow), M (magenta), and C (cyan). The filter segments in various colors can be formed by printing or photolithography and by using the colored composition according to the invention.

Examples of the transparent substrate include glass plates of quartz glass, borosilicate glass, alumina silicate salt glass, surface-silica-coated soda lime glass, and the like; and resin plates of polycarbonate, polymethyl methacrylate, polyethylene terephthalate, and the like.

Examples of the reflective substrate include silicon or other transparent substrates whereon a thin film of aluminum, silver, silver/copper/palladium alloy, or the like is formed.

For production of multi-color filter segments, a printing process is superior in mass-production efficiency, because it is possible to form patterns only by printing and drying a pattern repeatedly with the various colored compositions prepared above as printing inks. Further, progress in printing technology made it possible to print an extremely narrow pattern higher in dimensional accuracy and smoothness. For printing, preferable is a composition that is resistant to the drying and solidification of the ink on a printing plate or on a blanket. In addition, control of the fluidity of the ink in a printing machine is also important, and it is also possible to adjust the viscosity of the ink by using a dispersing agent or an extender pigment.

When filter segments in various colors are formed by photolithography, colored compositions prepared as the above-described solvent- or alkali-development-type color resist are coated on a transparent substrate to a dry film thickness of 0.2 to 5 μm by means of spray coating, spin coating, slit coating, roll coating, and the like. The film after drying is exposed as needed to ultraviolet ray via a mask having a predetermined pattern placed in the state in contact or not in contact with the film. Then, after a desired pattern is formed on the film by removing the unhardened area thereon, for example, by immersing the film in a solvent or an alkaline developing solution or spraying a developing solution onto the film via a spray nozzle. A color filter is produced by repeating similar operations for other colors. The film may be heated as needed for accelerate polymerization of the colored resist. Color filters higher in accuracy are produced by photolithography than by the printing process.

During development, an aqueous solution of sodium carbonate, sodium hydroxide, or the like is used as the alkaline developing solution, and additionally, an organic alkali such as dimethylbenzylamine and triethanolamine may also be used. In addition, an antifoaming agent or a surfactant may be added to the developing solution.

For improvement in the sensitivity of ultraviolet ray exposure, the color resist may be exposed to the ray after it is coated with a film for preventing the polymerization inhibition by oxygen, which is produced by coating the color resist with a water-soluble or alkali-soluble resin such as polyvinylalcohol and a water-soluble acrylic resin and drying the resulting resist.

The color filter according to the invention can be produced by, in addition to the methods above, electrodeposition, transfer, or other method, and the colored composition according to the invention may be used in any of the methods. Electrodeposition is a method of forming a color filter by using a transparent conductive film formed on a transparent substrate and electrodepositing filter segments in various colors on the transparent conductive film by electophoresis of colloid particles.

Alternatively, the transfer method is a method of forming a color filter layer previously on the surface of a removable transfer base sheet and transferring the color filter layer on to a desirable transparent substrate.

It is possible to raise the contrast of liquid crystal display panels further if a black matrix is formed on a transparent substrate or a reflective substrate in advance to the filter segments. Inorganic films of chromium, chromium/chromium oxide multilayer, titanium nitride, and the like and resin films containing a light-shielding agent dispersed therein are used as the black matrix, but the black matrix is not limited thereto. In addition, a thin film transistor (TFT) may be formed on the above-described transparent substrate or reflective substrate before formation of the filter segments. Filter segments formed on a TFT substrate expands the aperture ratio and thus improves the brightness of liquid crystal display panels.

An overcoat film, a columnar spacer, a transparent conductive film, a liquid crystal orientation film, or the like is formed on the color filter according to the invention as needed.

Such liquid crystal display panels are produced by bonding color filters on two opposing substrates with a sealant, injecting a liquid crystal from an injection port at the seal area, sealing the injection port, and adhering a polarization film or a phase difference film as needed on the outside surface of the two substrates.

The liquid crystal display panel can be used in the liquid crystal display mode for performing multicolor printing by using a color filter of twisted nematic (TN), super-twisted nematic (STN), in-plane-switching (IPS), vertically alignment (VA), optically compensated bend (OCB), or the like.

EXAMPLE 1

Hereinafter, the invention will be described with reference to Examples. "Part" and "%" in the following examples represent "parts by weight" and "% by weight", respectively.

<Preparation of Aluminum Salt of Quinoline Derivative [A]>

In a 500-mL four-necked flask, placed was 450 parts of 101% sulfuric acid prepared from fuming sulfuric acid (25% $SO_3$) and sulfuric acid; and 45 parts of C.I. Pigment Yellow 138 ("Paliotol Yellow-K0961-HD", manufactured by BASF) was added thereto gradually. The mixture was stirred at 80° C. for 3 hours, and absence of unreacted raw materials was confirmed by liquid chromatography. The reaction solution was poured into 5,000 parts of ice water while stirring, allowing a sulfonated compound to precipitate. The precipitated sulfonated compound was filtered, washed with 2,000 parts of 0.1% hydrochloric acid, and further washed with 2,000 parts of purified water, to give a paste of the sulfonated compound of C.I. Pigment Yellow 138. The sulfonated compound paste was redispersed in 5,000 parts of water (pH of the redispersed slurry: 2.3), and the dispersion was adjusted to a pH of 11.5 by addition of a 25% aqueous sodium hydroxide solution while stirring. During adjustment of the pH, the reaction solution changed from an yellow slurry to a red solution. The pH of the solution was readjusted in every 5 minutes, and the solution was stirred for 1 hour. The reaction solution was further stirred at a pH of 11.5 at 60° C. for 3 hours. An aqueous solution containing 47 parts of aluminum chloride (hexahydrate) was added gradually dropwise to the red solution, to give an yellow precipitate. The pH of the mixture after complete addition of the aqueous aluminum chloride solution was 3.5. The yellow precipitate was filtered, washed with a great amount of water, and dried at 80° C., to give 40 parts of the aluminum salt of quinoline derivative [A].

<Analysis of Aluminum Salt of Quinoline Derivative [A]>

The aluminum salt of quinoline derivative [A] was dissolved in DMF, and the solution was analyzed by using an LC/MS analyzer manufactured by Japan Waters, "Platform LCZ" (ESI: electron spray ionization). As a result, the highest peak having an area ratio of 70% and an m/z of 809 $[M-1]^-$ was observed at a wavelength of 420 nm. The peak corresponds to the molecular ion of a quinoline derivative represented by General formula (2) wherein n, m, and X are respectively 4, 4, and a chlorine atom. In addition, for measuring the amount of aluminum contained in the quinoline derivative, the strength ratio of the aluminum atom to the chlorine atom contained in the aluminum salt of quinoline derivative [A] was determined by using a fluorescent X-ray analyzer "SXF 1200" manufactured by Shimadzu Corporation. At the time, the calibration curve for use in determining the amount of aluminum contained in the quinoline derivative was prepared by blending aluminum oxide powder in the sulfonated compound of C.I. Pigment Yellow 138 obtained as an intermediate at various rates and measuring the strength ratio of the aluminum atom to the chlorine atom therein. The results revealed that 3.06 aluminum atoms were present in one molecule of the aluminum salt of quinoline derivative [A] and bound to one sulfonic acid and 2 carboxylic acids forming salts.

<Preparation of Calcium Salt of Quinoline Derivative [B]>

In a 500-mL four-necked flask, placed was 450 parts of fuming sulfuric acid (25% $SO_3$); and 45 parts of C.I. Pigment Yellow 138 ("Paliotol Yellow-K0961-HD", manufactured by BASF) was added thereto gradually. The mixture was stirred at 70° C. for 1 hour, and absence of unreacted raw materials was confirmed by liquid chromatography. The reaction solution was poured into 5,000 parts of ice water while stirring, allowing a sulfonated compound to precipitate. The precipitated sulfonated compound was filtered, washed with 2,000 parts of 0.1% hydrochloric acid, and washed additionally with 2,000 parts of purified water, to give a paste of the sulfonated compound of C.I. Pigment Yellow 138. The sulfonated compound paste was redispersed in 5,000 parts of water (pH of the redispersed slurry: 2.3), and the dispersion was adjusted to a pH of 11.5 by addition of 25% aqueous sodium hydroxide solution while stirring. The pH of the solution was readjusted in every 5 minutes, and the solution was stirred for 1 hour. The reaction solution was a red solution. To the red solution, an aqueous solution containing 30 parts of calcium chloride (dihydrate) was added dropwise, to give an yellow precipitate. The yellow precipitate was filtered, washed with a great amount of water, and dried at 80° C., to give 40 parts of the calcium salt of quinoline derivative [B].

<Analysis of Calcium Salt of Quinoline Derivative [B]>

The obtained calcium salt of quinoline derivative [B] was dissolved in DMF; and the solution was analyzed by using an LC/MS analyzer manufactured by Japan Waters, "Platform LCZ" (ESI: electron spray ionization). As a result, two large peaks having m/z's of 791 and 809 $[M-1]^-$ were observed at a wavelength of 420 nm in the chromatogram. These peaks correspond to the molecular ions of quinoline derivatives represented by General formulae (1) and (2) wherein n, m, and X are respectively 4, 4, and a chlorine atom. In addition, for measuring the amount of calcium contained in the quinoline derivative, the strength ratio of the calcium atom to the chlorine atom contained in the calcium salt of quinoline derivative [B] was determined by using a fluorescent X-ray. At the time, the calibration curve for use in determining the amount of calcium contained in the quinoline derivative was prepared by blending calcium in the sulfonated compound of C.I. Pigment Yellow 138 obtained as an intermediate at various rates and measuring the strength ratio of the calcium atom to the chlorine atom therein. The results revealed that 2.56 calcium atoms were present in one molecule of the calcium salt of quinoline derivative [B] and bound to one sulfonic acid and 1 to 2 carboxylic acids, forming salts.

<Preparation of Amine Salt of Quinoline Derivative [C]>

43 parts of an amine salt of quinoline derivative [C] was prepared in a similar manner to the calcium salt of quinoline derivative [B], except that calcium chloride was replaced with an aqueous solution containing 36 parts of a coconut oil amine acetate salt ("Acetamin 24", manufactured by Kao Corp.) in hot water, <Preparation of Quinoline Derivative [D]>

45 parts of C.I. Pigment Yellow 138 (manufactured by BASF "Paliotol Yellow D0960") was added gradually to 450 parts of 101% sulfuric acid prepared from fuming sulfuric acid (25% $SO_3$) and sulfuric acid, and the mixture was stirred at 80° C. for 3 hours, allowing a sulfonation reaction to proceed. The reaction solution was poured into 5,000 parts of ice water, and the precipitate was filtered, washed with 2,000 parts of 0.1% hydrochloric acid, and additionally with 2,000 parts of purified water, to give a paste of the sulfonated compound of quinophthalone. The water-wet paste was redispersed in 5,000 parts of water, and the dispersion was adjusted to a pH of 11.5 by addition of an aqueous sodium hydroxide solution. The solution was stirred additionally for one hour while the pH of the solution was adjusted by addition of an aqueous sodium hydroxide solution. The reaction solution changed from an yellow suspension to a red solution. The reaction solution was then heated to 60° C. at pH 11.5 and stirred for 3 hours. The solution was then adjusted to a pH of 1 or less by addition of hydrochloric acid and stirred at 90° C. for 2 hours. Precipitate formed was filtered, washed and dried, to give a quinoline derivative [D].

<Preparation and Analysis of Compound [E]>

6 parts of C.I Pigment Yellow 138 ("Paliotol Yellow-D0960", manufactured by BASF) was added to 78 parts of fuming sulfuric acid (25% $SO_3$) at 15° C. while the solution is stirred. After stirred for 3 hours, the mixture was poured on 150 parts of ice. After the mixture was left for 30 minutes, the resulting suspension was filtered, and the product thus obtained was washed with 30 parts of water. The product was poured into 200 parts of water, and the mixture was neutralized with an aqueous ammonia solution (the aqueous ammonia solution was added until the pH becomes 7). The mixture was added with 45 parts of ammonium chloride and additionally stirred at 80° C. for 30 minutes. Precipitate formed was filtered at 60° C. The wet crystal was washed with water and dried at 80° C., to give 10 parts of the sulfonated compound of C.I. Pigment Yellow 138 (hereinafter, referred to as compound [E]). The compound [E] was dissolved in DMF, and the solution was analyzed by using an LC/MS analyzer manufactured by Japan Waters, "Platform LCZ" (ESI: electron spray ionization). The highest peak having an m/z of 773 $[M-1]^-$ was observed at a wavelength of 420 nm. The retention time of compound [E] in chromatography was distinctively different from those of the quinoline derivative peaks having m/z's of 791 and 809 $[M-1]^-$.

<Preparation and Analysis of Compound [F]>

Into a 500-mL four-necked flask containing 300 parts of 98% sulfuric acid, 20 parts of C.I. Pigment Yellow 138 ("Paliotol Yellow K0961-HD", manufactured by BASF) was added gradually. The mixture was allowed to react at 120° C. for 5 hours, to give a sulfonated compound of a phthalimidoquinophthalone compound. The reaction mixture was poured into 3,000 parts of water while stirring, allowing the sulfonated compound of the phthalimidoquinophthalone compound to precipitate, and after stirring additionally for 30 minutes, the precipitate was collected by filtration and washed with water three times. The wet cake obtained was washed with 300 parts of 1% dilute sulfuric acid, filtered, and washed; and then mixed with an equivalent mole of potassium hydroxide. The resulting mixture was adjusted to a pH of 9, to give the potassium salt of quinophthalone sulfonic acid. Then, an equivalent molar amount of calcium chloride was added thereto, allowing the calcium salt of quinophthalone sulfonic acid to precipitate, and the precipitate was collected by filtration and washed with water until the washing solution became pH 7 to 6. The washed precipitate was dried in a hot air drier, to give 57 parts of the quinophthalone derivative (calcium quinophthalone sulfonate, hereinafter referred to as compound [F]). The compound [F] obtained was dissolved in DMF and the solution was analyzed by using an LC/MS analyzer manufactured by Japan Waters, "Platform LCZ" (ESI: electron spray ionization). The highest peak having an m/z of 773 $[M-1]^-$ was detected at a wavelength of 420 nm in the chromatogram. The retention time of the compound [F] is distinctively different from those of the quinoline derivative peaks having m/z's of 791 and 809 $[M-1]^-$.

<Preparation and Analysis of Compound [G]>

Into a 5-L beaker containing 400 parts of ice and 1,400 parts of water, 200 g of potassium hydroxide was added gradually while the solution was stirred. 200 parts of C.I. Pigment Yellow 138 ("Paliotol Yellow K0961-HD", manufactured by BASF) was added to the solution and allowed to react at 90° C. for 8 hours. The mixture was allowed to cool to room temperature and then added dropwise with 270 mL of 36% hydrochloric acid. The reaction mixture was filtered, and the cake was washed with water and dried under vacuum, to give a compound "G". The compound [G] obtained was dissolved in DMF and the solution was analyzed by using an LC/MS analyzer manufactured by Japan Waters, "Platform LCZ" (ESI: electron spray ionization). The highest peak having an m/z of 729 $[M-1]^-$ was detected at a wavelength of 420 nm. The peak corresponds to the molecular ion of the quinoline derivative represented by General formula (2) having no sulfonic acid group (the sulfonic acid group was replaced with a hydrogen atom) wherein n, m, and X are respectively 4, 4, and a chlorine atom.

<Preparation of Acrylic Resin Solution 1>

70.0 parts of cyclohexanone was placed in a separable four-necked flask equipped with a thermometer, a condenser, a nitrogen gas inlet, a stirrer and a dropping funnel; after the flask was heated to 80° C. and purged with nitrogen, a mixture of 13.3 parts of n-butyl methacrylate, 4.6 parts of 2-hydroxyethyl methacrylate, 4.3 parts of methacrylic acid, 7.4 parts of p-cumylphenol ethylene oxide-modified acrylate ("Aronix M110", manufactured by Toagosei Co., Ltd.) and 0.4 part of 2,2'-azobisisobutylonitrile was added dropwise from the dropping funnel over the period of 2 hours. After dropwise addition, the mixture was allowed to react additionally for 3 hours, to give a desirable solution of acrylic resin (weight-average molecular weight: 26,000) containing solid matters at a concentration of 30%.

After the solution was allowed to cool to room temperature, approximately 2 g of the resin solution was collected and dried at 180° C. for 20 minutes. After measuring the amount of the nonvolatile matters, the other resin solution was diluted with cyclohexanone based on the measurement to a nonvolatile matter concentration of 20%, to give an acrylic resin solution 1.

<Preparation of Acrylic Resin Solution 2>

800 parts of cyclohexanone was placed in a reaction container. After the container was heated to 100° C. under nitrogen stream, a mixture of 60.0 parts of styrene, 60.0 parts of methacrylic acid, 65.0 parts of methyl methacrylate, 65.0 parts of butyl methacrylate, and 10.0 parts of azobisisobutylonitrile was added dropwise from a dropping funnel at the same temperature over the period of 1 hour, allowing a polymerization reaction to proceed. After dropwise addition, the mixture was allowed to react at 100° C. additionally for 3 hours, added with a solution of 2.0 parts of azobisisobutylonitrile in 50 parts of cyclohexanone, and further allowed to react at 100° C. for 1 hour, to give a solution of an acrylic resin having a weight-average molecular weight of approximately 40,000.

After the solution was allowed to cool to room temperature, approximately 2 g of the resin solution was collected and dried at 180° C. for 20 minutes. After measuring the amount of the nonvolatile matters, the other resin solution was diluted with cyclohexanone based on the measurement to a nonvolatile matter concentration of 20%, to give an acrylic resin solution 2.

<Preparation of Modified Yellow Pigment 1>

500 parts of an yellow quinophthalone pigment C.I. Pigment Yellow 138 ("Paliotol Yellow-K0960-HD", manufactured by BASF), 500 parts of sodium chloride, and 250 parts of diethyleneglycol were placed in a 1-gallon stainless steel kneader (manufactured by Inoue Manufacturing), and the mixture was blended at 120° C. for 2 hours. Then, the blend was poured into 5 liters of hot water, and the mixture was stirred consistently at 70° C. for 1 hour, to give a slurry, and the resulting solid was filtered, washed repeatedly for removal of sodium chloride and diethyleneglycol, and dried at 80° C. for one day, to give 490 parts of a modified yellow pigment 1.

<Preparation of Modified Green Pigment 1>

500 parts of a green phthalocyanine pigment C.I. Pigment Green 36 ("Reonol Green 6YK", manufactured by Toyo Ink Mfg.), 500 parts of sodium chloride, and 250 parts of diethyleneglycol were placed in a 1-gallon stainless steel kneader (manufactured by Inoue Manufacturing) and the mixture was blended at 120° C. for 2 hours. Then, the blend was poured into 5 liters of hot water, and the mixture was stirred consistently at 70° C. for 1 hour, to give a slurry, and the resulting solid was filtered, washed repeatedly for removal of sodium chloride and diethyleneglycol, and dried at 80° C. for one day, to give 490 parts of an modified green pigment 1.

EXAMPLE 1 to 11 and COMPARATIVE EXAMPLE 1 to 10

A mixture having the composition shown in the following Table 1 was blended uniformly, dispersed in an Eiger mill by using zirconia beads of 1 mm in diameter for 3 hours, and then filtered through a 5-μm filter, to give a pigment dispersion.

TABLE 1

| | Blending amount | | | | | | | | |
|---|---|---|---|---|---|---|---|---|---|
| | Pigment (*2) | | Pigment dispersing agent (*1) | | Resinic dispersing agent | | Acrylic resin | | Solvent |
| Ex. No. | Kind | Amount (parts) | Symbol | Amount (parts) | Kind | Amount (parts) | Kind | Amount (parts) | Amount (parts) |
| Ex. 1 | Modified | 9.0 | [A] | 1.0 | — | — | (1) | 50.0 | 40.0 |
| Ex. 2 | yellow | 9.5 | [A] | 0.5 | — | — | (1) | 50.0 | 40.0 |
| Ex. 3 | pigment | 9.5 | [A] | 0.5 | PB-821 | 2.0 | (1) | 40.0 | 48.0 |
| Ex. 4 | | 9.0 | [B] | 1.0 | — | — | (1) | 50.0 | 40.0 |
| Ex. 5 | | 9.0 | [B] | 1.0 | SP 24000 | 2.0 | (1) | 40.0 | 48.0 |
| Ex. 6 | | 9.0 | [C] | 1.0 | — | — | (1) | 50.0 | 40.0 |
| Ex. 7 | | 9.0 | [D] | 1.0 | — | — | (1) | 50.0 | 40.0 |
| Comp. Ex. 1 | | 10.0 | — | | — | — | (1) | 50.0 | 40.0 |
| Comp. Ex. 2 | | 9.0 | [E] | 1.0 | — | — | (1) | 50.0 | 40.0 |
| Comp. Ex. 3 | | 9.0 | [F] | 1.0 | — | — | (1) | 50.0 | 40.0 |
| Comp. Ex. 4 | | 9.5 | [F] | 0.5 | — | — | (1) | 50.0 | 40.0 |
| Comp. Ex. 5 | | 9.0 | [G] | 1.0 | — | — | (1) | 50.0 | 40.0 |
| Ex. 8 | Modified | 9.0 | [A] | 1.0 | — | — | (1) | 50.0 | 40.0 |
| Ex. 9 | green | 9.0 | [B] | 1.0 | PB-821 | 2.0 | (1) | 40.0 | 48.0 |
| Comp. Ex. 6 | pigment | 10.0 | — | | — | — | (1) | 50.0 | 40.0 |
| Comp. Ex. 7 | | 9.0 | [F] | 1.0 | — | — | (1) | 50.0 | 40.0 |
| Ex. 9 | C.I. Pigment | 9.0 | [A] | 1.0 | — | — | (1) | 50.0 | 40.0 |
| Comp. Ex. 8 | Green 7 | 9.0 | [E] | 1.0 | — | — | (1) | 50.0 | 40.0 |

TABLE 1-continued

| | Blending amount | | | | | | | | |
|---|---|---|---|---|---|---|---|---|---|
| | Pigment (*2) | | Pigment dispersing agent (*1) | | Resinic dispersing agent | | Acrylic resin | | Solvent |
| Ex. No. | Kind | Amount (parts) | Symbol | Amount (parts) | Kind | Amount (parts) | Kind | Amount (parts) | Amount (parts) |
| Ex. 10 | C.I. Pigment | 9.0 | [A] | 1.0 | — | — | (1) | 50.0 | 40.0 |
| Comp. Ex. 9 | Yellow 139 | 9.0 | [F] | 1.0 | — | — | (1) | 50.0 | 40.0 |
| Ex. 11 | C.I. Pigment | 9.0 | [A] | 1.0 | — | — | (1) | 50.0 | 40.0 |
| Comp. Ex. 10 | Yellow 185 | 9.0 | [F] | 1.0 | — | — | (1) | 50.0 | 40.0 |

*1: Quinoline derivatives [A] to [D] in the Examples, and compounds [E] to [G] in the Comparative examples.
*2: The pigments used in Examples and Comparative examples were as follows:
C.I. Pigment Green 7: "Reonol Green YS", manufactured by Toyo Ink Mfg.
C.I. Pigment Yellow 139: "Paliotol Yellow D1819", manufactured by BASF
C.I. Pigment Yellow 185: "Paliotol Yellow D1155", manufactured by BASF
*3: The resinic dispersing agents used in Examples and Comparative examples were as follows: PB-821: "AJISPER PB-821" manufactured by Ajinomoto Fine Chemical
SP24000: "SOLSPERSE 24000", manufactured by Avecia <Alkali development-type resist>

SP24000: "SOLSPERSE 24000", manufactured by Avecia

<Alkali development-type resist>

A mixture having the following composition was blended until homogeneity and filtered through a 1-μm filter, to give an alkali development-type resist.

| | |
|---|---|
| Pigment dispersion shown in Table 1 | 60.0 parts |
| Photopolymerization initiator ("Irgacure 907", manufactured by Ciba) | 1.2 parts |
| Trimethylolpropane triacrylate ("NK Ester ATMPT", manufactured by Shin-Nakamura Chemical) | 4.2 parts |
| Sensitizer ("EAB-F", manufactured by Hodogaya Chemical Co., Ltd.) | 0.4 part |
| Acrylic resin solution 2 | 11.0 parts |
| Cyclohexanone | 23.2 parts |

The yield value and the thixotropy index of the alkali development-type resist obtained were measured by using a type-E viscometer ("R110", manufactured by Toki Sangyo).

In addition, the viscosity of the alkali development-type resist obtained before and after storage at 40° C. for 7 days was determined by using a type-E viscometer ("R110", manufactured by Toki Sangyo). The storage stability was evaluated as ◎ if the difference between the viscosities before and after storage at 40° C. for 7 days was less than 10%; ○, if 10% or more and less than 20%; Δ, if 20% or more and less than 50%; and X, if 50% or more.

Moreover, the alkali development-type resist obtained was spin-coated on a substrate having a thickness of 0.7 mm of 360 mm×465 mm in size to an average film thickness of 1.8 μm and dried at 70° C. for 30 minutes. After measurement of the film thickness (A) at the center and at a point on the diagonal line separated at a distance of 200 mm from the center, the uniformity of film thickness was evaluated according to the following formula.

$$(A-B)\times 100/((A+B)/2)\ [\%]$$

Evaluation results are summarized in Table 2.

TABLE 2

| | Evaluation | | | |
|---|---|---|---|---|
| | Kinetic viscosity | | Storage stability | Uniformity in film |
| Ex. No. | Yield value | TI value | over time | thickness |
| Ex. 1 | 0.00018 | 1.03 | ◎ | 1.23% |
| Ex. 2 | 0.00136 | 1.75 | ○ | 2.08% |
| Ex. 3 | 0.00037 | 1.05 | ◎ | 1.50% |
| Ex. 4 | 0.00077 | 1.08 | ○ | 2.01% |
| Ex. 5 | 0.00018 | 1.03 | ◎ | 1.45% |
| Ex. 6 | 0.04013 | 1.25 | ○ | 1.98% |
| Ex. 7 | 0.01059 | 1.69 | ○ | 1.80% |
| Comp. Ex. 1 | 8.80000 | 3.46 | X | 6.55% |
| Comp. Ex. 2 | 8.81680 | 3.46 | X | 5.98% |
| Comp. Ex. 3 | 2.03632 | 2.18 | Δ | 2.00% |
| Comp. Ex. 4 | 5.62830 | 3.4 | Δ | 2.05% |
| Comp. Ex. 5 | 5.62830 | 3.4 | X | 9.87% |
| Ex. 8 | 0.08013 | 1.29 | ◎ | 1.25% |
| Ex. 9 | 0.00018 | 1.03 | ◎ | 1.32% |
| Comp. Ex. 6 | 8.81680 | 3.46 | X | 9.87% |
| Comp. Ex. 7 | 5.65280 | 3.84 | X | 9.75% |
| Ex. 9 | 0.00748 | 1.18 | ○ | 2.00% |
| Comp. Ex. 8 | 8.68000 | 3.46 | X | 4.09% |
| Ex. 10 | 0.00806 | 1.28 | ○ | 1.99% |
| Comp. Ex .9 | 5.25800 | 3.84 | X | 7.77% |
| Ex. 11 | 0.00017 | 1.03 | ◎ | 1.33% |
| Comp. Ex. 10 | 8.96700 | 3.86 | X | 9.60% |

As apparent from Table 2, the colored composition according to the invention is excellent in dispersion stability, storage stability, and others.

Then, a color filter having a red filter segment, a blue filter segment, and a green filter segment was prepared according to the following method.

<Red Resist>

A mixture having the following composition was blended uniformly, then dispersed in an Eiger mill by using zirconia beads of 1 mm in diameter for 3 hours, and filtered through a 5-μm filter, to give a red pigment dispersion.

| | |
|---|---|
| Red pigment ("Irgafor Red B-CF", manufactured by Ciba) | 9.0 parts |
| Dyestuff derivative 52 | 1.0 part |

-continued

| | |
|---|---|
| Acrylic resin solution 1 | 50.0 parts |
| Cyclohexanone | 40.0 parts |

An alkali development-type red resist was obtained by using the red pigment dispersion obtained in a similar manner to the alkali development-type resist in Example 1.

<Blue Resist>

A mixture having the following composition was blended uniformly, then dispersed in an Eiger mill by using zirconia beads of 1 mm in diameter for 3 hours, and filtered through a 5-μm filter, to give a blue pigment dispersion.

| | |
|---|---|
| Blue pigment ("Reonol blue ES", manufactured by Toyo Ink Mfg.) | 9.0 parts |
| Dyestuff derivative 47 | 1.0 part |
| Acrylic resin solution 1 | 50.0 parts |
| Cyclohexanone | 40.0 parts |

An alkali development-type blue resist was obtained by using the blued pigment dispersion obtained in a similar manner to the alkali development-type resist in Example 1.

The red resist was spin-coated on a glass substrate to a film thickness that gives a chromaticity of x=0.603 and y=0.328 under C light source. After drying, the red resist was exposed to a stripe pattern in an exposure machine and developed in an alkaline developing solution for 90 seconds, to give a stripe-patterned red filter segment. The alkaline developing solution used contained 1.5% sodium carbonate, 0.5% sodium bicarbonate, 8.0% an anionic surfactant ("Perilex NBL", manufactured by Kao Corporation) and 90% water.

Then, the yellow resist obtained in Example 1 and the green resist obtained in Example 7 were blended at a weight ratio of 1:1, giving a green resist, which was applied onto a substrate to a film thickness that gives a chromaticity of x=0.320 and y=0.530 under the C light source. After drying, the green resist was exposed to a stripe pattern in an exposure machine and developed in an alkaline developing solution for 90 seconds, to give a stripe-patterned green filter segment.

Further, a blue resist was coated to a thickness that gives a chromaticity of x=0.136 and y=0.142 under the C light source, and a stripe-patterned blue filter segment was formed over the red filter segment and green filter segment.

The shapes of the filter segments in various colors were favorable and the resolutions thereof were also favorable. Finally, the color filter obtained was heated in an oven at 230° C. for 30 minutes, allowing the remaining polymerizable functional groups to react completely, to give a color filter having stripe-patterned filter segments in three colors, red, green, and blue, on a transparent substrate.

Separately, a color filter having a magenta color filter segment, a cyan color filter segment, and an yellow color filter segment was prepared according to the following method.

<Magenta Resist>

A mixture having the following composition was blended uniformly, then dispersed in an Eiger mill by using zirconia beads of 1 mm in diameter for 3 hours, and filtered through a 5-μm filter, to give a magenta pigment dispersion.

| | |
|---|---|
| Magenta color pigment ("Hostaperm Pink E", manufactured by Clariant) | 9.0 parts |
| Dyestuff derivative 45 | 1.0 part |
| Acrylic resin solution 1 | 50.0 parts |
| Cyclohexanone | 40.0 parts |

An alkali development-type magenta resist was obtained by using the magenta pigment dispersion in a similar manner to the alkali development-type resist in Example 1.

<Cyan Resist>

A mixture having the following composition was blended uniformly, then dispersed in an Eiger mill by using zirconia beads of 1 mm in diameter for 3 hours, and filtered through a 5-μm filter, to give a cyan pigment dispersion.

| | |
|---|---|
| Cyan color pigment ("Reonol blue FG7531", manufactured by Toyo Ink Mfg.) | 9.0 parts |
| Dyestuff derivative 47 | 1.0 parts |
| Acrylic resin solution 1 | 50.0 parts |
| Cyclohexanone | 40.0 parts |

An alkali development-type cyan resist was obtained by using the cyan pigment dispersion obtained in a similar manner to the alkali development-type resist in Example 1.

The magenta resist was spin-coated on a glass substrate to a thickness that give a chromaticity of x=0.348 and y=0.196 under C light source. After drying, the magenta resist was exposed to a stripe pattern in an exposure machine and developed in an alkaline developing solution for 90 seconds, to give a stripe-patterned magenta filter segment. The alkaline developing solution used contained 1.5% sodium carbonate, 0.5% sodium bicarbonate, 8.0% an anionic surfactant ("Perilex NBL", manufactured by Kao Corporation) and 90% water.

Then, the yellow resist obtained in Example 1 was coated to a thickness that gives a chromaticity of x=0.388 and y=0.459 under the C light source. After drying, the yellow resist was exposed to a stripe pattern in an exposure machine and developed in an alkaline developing solution for 90 seconds, to give a stripe-patterned yellow filter segment.

Further, the cyan resist was coated to a chromaticity that gives a chromaticity of x=0.172 and y=0.246 under the C light source, and a stripe-patterned cyan filter segment was formed over the magenta filter segment and yellow filter segment.

The shapes of the filter segments in various colors were favorable and the resolutions thereof were also favorable. Finally, the color filter obtained was heated in an oven at 230° C. for 30 minutes, allowing the remaining polymerizable functional groups to react completely, to give a color filter having stripe-patterned filter segments in three colors, magenta, yellow, and cyan, on a transparent substrate.

As described above, the colored composition for color filters according to the invention is superior in the dispersion stability of the pigment, in particular in the storage stability thereof, because a quinoline derivative or an amine or metal salt thereof is used as the pigment-dispersing agent.

Thus, it is possible to produce a color filter having uniform filter segments, by using the colored composition for color filters according to the invention.

What is claimed is:

1. A colored composition for color filters, containing: a pigment carrier made of a transparent resin, a precursor thereof, or a mixture thereof; an organic pigment; and a pigment-dispersing agent comprising a quinoline derivative represented by the following general formula (1) or (2):

general formula (1):

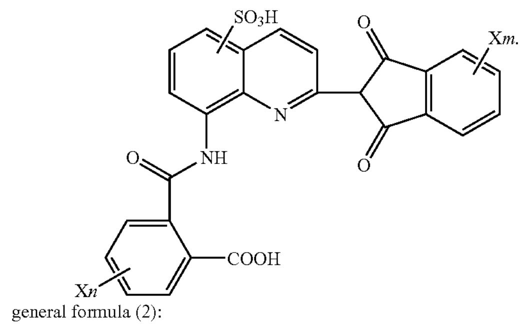

general formula (2):

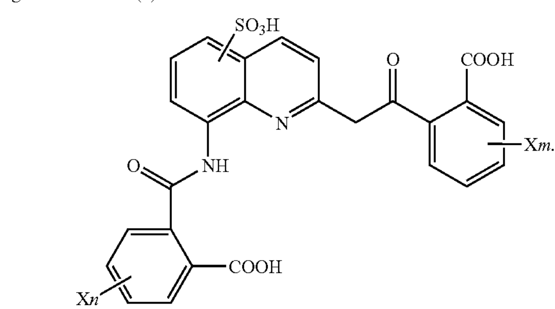

where X represent a halogen atom selected from chlorine, bromine and iodine; n and m each independently represent the number of halogen atoms X, and are each an integer of 0 to 4, or an amine or metal salt thereof.

2. The color composition according to claim 1, wherein the pigment-dispersing agent is an aluminum salt of the quinoline derivative represented by general formula (1) or (2).

3. The color composition according to claim 1, further containing a resinic dispersing agent.

4. The color composition according to claim 3, wherein the resinic dispersing agent is a basic resinic dispersing agent.

5. The color composition according to claim 1, wherein the pigment carrier contains a copolymer resin of a compound (a) represented by the following general formula (3):

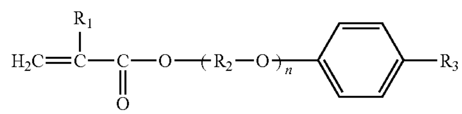

where $R_1$ represents H or $CH_3$; $R_2$ represents an alkylene group; $R_3$ represents H or an alkyl group having 1 to 20 carbons which may contain a benzene ring; and n is an integer of 1 to 15, and a compound (b) having an ethylenically unsaturated double bond.

6. A color filter comprising filter segments formed with the color composition according to any one of claims 1 to 5.

7. A colored composition for color filters, containing: a pigment carrier made of a transparent resin, a precursor thereof, or a mixture thereof; an organic pigment; and a pigment-dispersing agent comprising a quinoline derivative represented by the following general formula

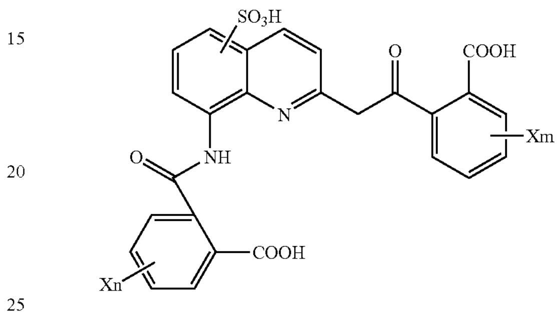

where X represent a halogen atom selected from chlorine, bromine and iodine; n and m each independently represent the number of halogen atoms X, and are each an integer of 0 to 4, or an amine or metal salt thereof.

8. The color composition according to claim 7, wherein the pigment-dispersing agent is an aluminum salt of the quinoline derivative.

9. The color composition according to claim 7, further containing a resinic dispersing agent.

10. The color composition according to claim 9, wherein the resinic dispersing agent is a basic resinic dispersing agent.

11. The color composition according to claim 7, wherein the pigment carrier contains a copolymer resin of a compound (a) represented by the following formula:

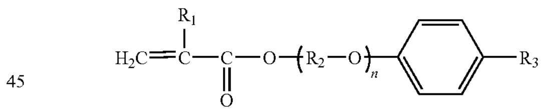

where $R_1$ represents H or $CH_3$; $R_2$ represents an alkylene group; $R_3$ represents H or an alkyl group having 1 to 20 carbons which may contain a benzene ring; and n is an integer of 1 to 15, and a compound (b) having an ethylenically unsaturated double bond.

12. A color filter comprising filter segments formed with the color composition according to any one of claims 7-11.

* * * * *